US011856436B2

United States Patent
Taherzadeh Boroujeni et al.

(10) Patent No.: US 11,856,436 B2
(45) Date of Patent: Dec. 26, 2023

(54) TRANSIENT COMPACT MEASUREMENT REPORTS VIA ALTERNATIVE BEAM INDEXING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/320,054

(22) Filed: May 13, 2021

(65) Prior Publication Data

US 2021/0360462 A1 Nov. 18, 2021

Related U.S. Application Data

(60) Provisional application No. 63/025,907, filed on May 15, 2020.

(51) Int. Cl.
*H04W 24/10* (2009.01)
*H04W 24/08* (2009.01)

(52) U.S. Cl.
CPC ......... *H04W 24/10* (2013.01); *H04W 24/08* (2013.01)

(58) Field of Classification Search
CPC ...... H04W 24/10; H04W 24/08; H04B 7/088; H04B 7/0695
See application file for complete search history.

(56) References Cited

U.S. PATENT DOCUMENTS

2010/0298017 A1* 11/2010 Dalsgaard ......... H04W 36/0088
455/507
2013/0301589 A1* 11/2013 Li ......................... H04W 24/10
370/329

(Continued)

FOREIGN PATENT DOCUMENTS

EP 3547566 A1 10/2019

OTHER PUBLICATIONS

Ericsson: "On the Use of SS for Beam Management and Beam Recovery," R1-1714295, 3GPP TSG-RAN WG1 #90, 3rd Generation Partnership Project (3GPP), Mobile Competence Centre, 650, Route Des Lucioles, F-06921 Sophia-Antipolis Cedex, France, vol. Prague, Czech Republic, Aug. 21-25, 2017, Aug. 25, 2017 (Aug. 25, 2017), 8 Pages, XP051317081, Retrieved from the Internet: URL: https://www.3gpp.org/ftp/TSG_RAN/WG1_RL1/TSGR1_90/Docs/, [retrieved on Aug. 20, 2017], Section 2.1, The Whole Document.

(Continued)

*Primary Examiner* — Walli Z Butt
*Assistant Examiner* — Thad N Defauw
(74) *Attorney, Agent, or Firm* — Loza & Loza, LLP

(57) ABSTRACT

A RAN node can indicate to a UE that a compact measurement report is to be used for beam measurements in a measurement report. A compact measurement report uses beam index numbers to indicate a position in a reference set. The reference set has a listing of resource indicators for beam measurements. As such, a reported beam measurement associated with a beam index number is also associated with the resource indicator positioned in the reference set indicated by the beam index number. The beam index numbers can be transmitted using fewer bits than are used for a resource indicator. The payload for a measurement report such as a L-SINR or L-RSP L1 measurement report is (Continued)

thereby reduced when the measurement report is transmitted as a compact measurement report.

30 Claims, 17 Drawing Sheets

(56) References Cited

U.S. PATENT DOCUMENTS

| | | | |
|---|---|---|---|
| 2015/0094114 A1* | 4/2015 | Rao | H04W 52/143 |
| | | | 455/522 |
| 2018/0227031 A1 | 8/2018 | Guo et al. | |
| 2019/0254110 A1* | 8/2019 | He | H04L 5/0048 |
| 2019/0306909 A1* | 10/2019 | Zhou | H04W 76/19 |

OTHER PUBLICATIONS

International Search Report and Written Opinion—PCT/US2021/032449—ISA/EPO—dated Sep. 1, 2021.

* cited by examiner

802a
| L1 Measurement Report (e.g. RSRP or SINR) ||
|---|---|
| CRI 1 (4 Bits) | Measurement 1 (Highest, Absolute) (7 Bits) |
| CRI 2 (4 Bits) | Measurement 2 (Diff) (4 Bits) |
| CRI 3 (4 Bits) | Measurement 3 (Diff) (4 Bits) |
| CRI 4 (4 Bits) | Measurement 4 (Diff) (4 Bits) |

802b
| Compact L1 Measurement Report (e.g. RSRP or SINR) ||
|---|---|
| Beam Index Number 1 (2 Bits) | Measurement 1 (Highest, Absolute) (7 Bits) |
| Beam Index Number 2 (2 Bits) | Measurement 2 (Diff) (4 Bits) |
| Beam Index Number 3 (2 Bits) | Measurement 3 (Diff) (4 Bits) |
| Beam Index Number 4 (2 Bits) | Measurement 4 (Diff) (4 Bits) |

802c
| Compact L1 Measurement Report (e.g. RSRP or SINR) ||
|---|---|
| Beam Index Number 1 (2 Bits) | Measurement 1 (Highest, Absolute) (7 Bits) |
| Beam Index Number 2 (2 Bits) | Measurement 2 (Diff) (4 Bits) |

TRANSIENT COMPACT MEASUREMENT REPORTS VIA ALTERNATIVE BEAM INDEXING

CROSS-REFERENCE TO RELATED APPLICATIONS

This application for patent claims priority to and the benefit of provisional patent application No. 63/025,907 entitled "Transient Compact Measurement Reports via Alternative Beam Indexing" filed in the United States Patent and Trademark Office on May 15, 2020, the entire content of which is incorporated herein by reference as if fully set forth below in its entirety and for all applicable purposes.

TECHNICAL FIELD

The technology discussed below relates generally to wireless communication networks, and more particularly, to L1 measurement reports in beam-based communication scenarios (e.g., millimeter wave beams). Some embodiments and techniques enable and provide communication devices, methods, and systems with techniques for reducing the payload of L1 measurement reports.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

To select one or more beams for communication between a base station and a UE, the base station may transmit a reference signal, such as a synchronization signal block (SSB) or a channel state information (CSI) reference signal (CSI-RS), on a plurality of beams in a beam sweeping manner. The UE can perform one or more measurements on the received beams and return a Layer 1 (L1) measurement report including the beam measurements of one or more of the measured beams. For example, the beam measurements may include a reference signal received power (RSRP) or signal-to-interference-plus-noise ratio (SINR).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method includes receiving, from a radio access network (RAN) entity, an indication to transmit a compact measurement report that uses beam index numbers indicating a position in a reference set, the reference set listing resource indicators for beam measurements, the compact measurement report reporting beam measurements. The method also includes receiving a plurality of beams, using measurements of the plurality of beams to generate the compact measurement report, and transmitting the compact measurement report to the RAN entity.

Another example provides a UE configured for wireless communication including a wireless transceiver, a memory, and a processor communicatively coupled to the wireless transceiver and the memory. The wireless transceiver, memory, and processor can be configured to receive, from a radio access network (RAN) entity, an indication to transmit a compact measurement report that uses beam index numbers indicating a position in a reference set, the reference set listing resource indicators for beam measurements, the compact measurement report reporting beam measurements. The wireless transceiver, memory, and processor can also be configured to receive a plurality of beams, use measurements of the plurality of beams to generate the compact measurement report, and transmit the compact measurement report to the RAN entity.

In another example, a method for wireless communication at a radio access network (RAN) node in a wireless communication network is disclosed. The method can include transmitting, to a user equipment (UE), an indication to transmit a compact measurement report that uses beam index numbers indicating a position in a reference set, the reference set listing resource indicators for beam measurements, the compact measurement report reporting beam measurements. The method can also include transmitting a plurality of beams, and receiving the compact measurement report from the UE.

Another example provides a RAN node configured for wireless communication including a wireless transceiver, a memory, and a processor communicatively coupled to the wireless transceiver and the memory. The wireless transceiver, memory, and processor can be configured to transmit to a user equipment (UE), an indication to transmit a compact measurement report that uses beam index numbers indicating a position in a reference set, the reference set listing resource indicators for beam measurements, the compact measurement report reporting beam measurements. The wireless transceiver, memory, and processor can also be configured to transmit a plurality of beams, and receive the compact measurement report from the UE.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 8A, 8B, and 8C are diagrams illustrating examples of various configurations of measurement reports according to some aspects.

DETAILED DESCRIPTION

Figure 1:
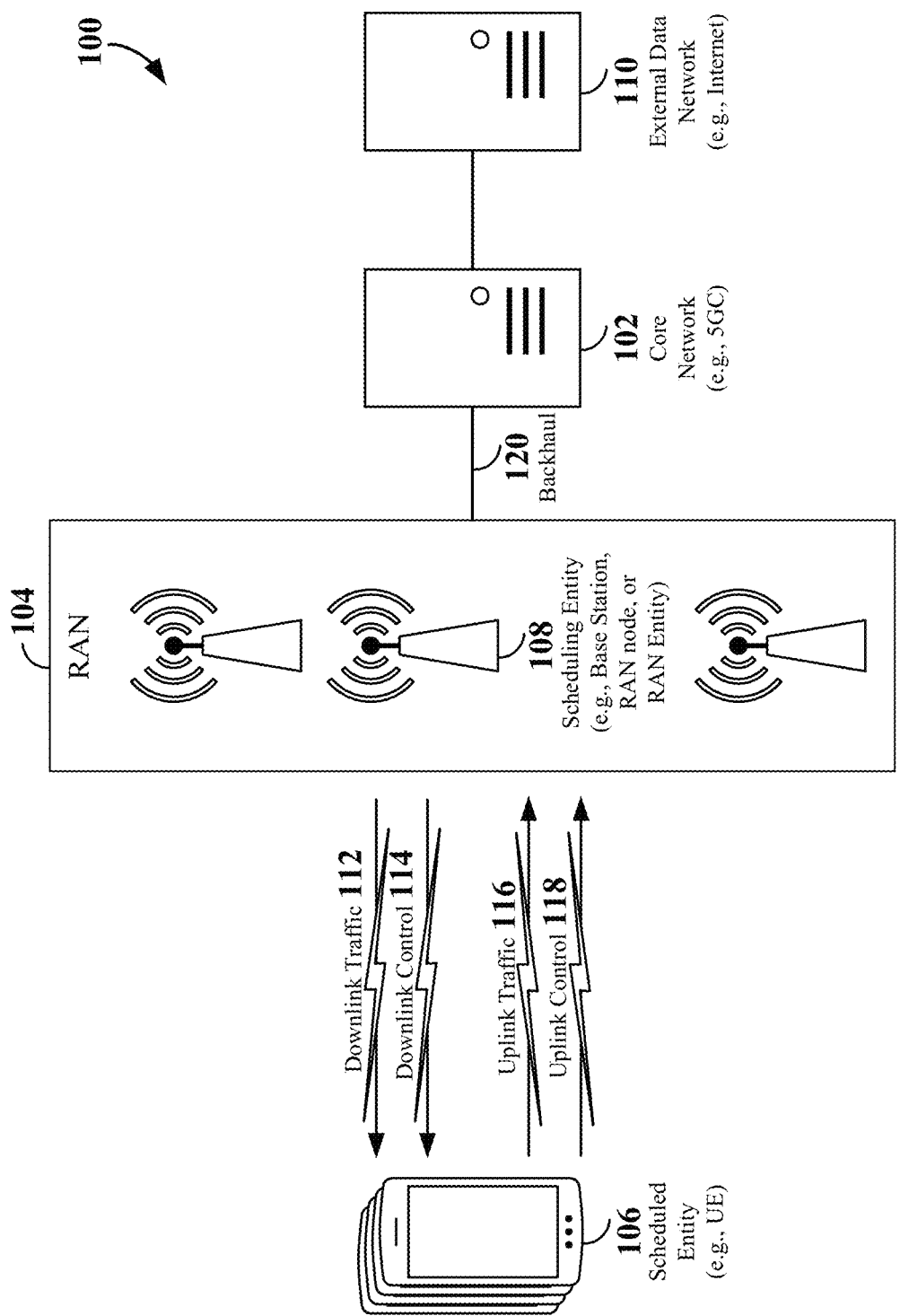
FIG. 1 is a schematic illustration of a wireless communication system within which aspects may be implemented.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure generally relate to reducing the size of measurement reports, particularly Layer 1 (L1) measurement reports reporting beam measurements such as reference signal received power (RSRP) or signal-to-interference-plus-noise ratio (SINR). The configurations of the measurement reports, often called report settings, can indicate the number of bits with which to report the beam measurements and the resource indicators. Some measurement reports, such as L1-RSRP and L1-SINR can be standardized and have 35 bit payloads. Every measurement that is transmitted consumes resources. Reduced payloads can result in more measurement reports being reliably sent.

Particular aspects of the subject matter described in this disclosure can be implemented to one or more of the following potential advantages. In some aspects the measurement reports can use alternative beam indexing. A measurement report can use beam index numbers to reference resource indicators instead of using the resource indicators. A beam index number indicates a position in a list of resource indicators in a reference set. The reference set can be a previously transmitted measurement report that used resources indicators or a preconfigured reference set already stored in the user equipment (UE) and radio access network (RAN) node. For example, an L1-SINR measurement report can report four beam measurements with each resource indicator using four bits. That L1-SINR measurement report therefor uses a total of sixteen bits for resource indicators. That L1-SINR can be a reference set having four positions with a resource indicator in each of the four positions. A two bit beam index number can indicate any one of those four positions and thereby indicate any one of those four resource indicators.

The present disclosure details compact measurement reports that use beam index numbers. A compact L1-SINR measurement report using the previously discussed L1-SINR measurement report as a reference set can report four beam measurements with each beam index number using two bits. That compact L1-SINR measurement report therefor uses a total of eight bits to indicate four resource indicators, a 50% reduction from sixteen bits. In many scenarios, such as before handoff or handover, frequent and periodic measurement reports may need to be reliably communicated. In such scenarios, radio resource control (RRC) signaling can indicate to a user equipment (UE) that compact measurement reports are to be periodically transmitted. At a later time, when the periodic measurement reports are no longer desired, RRC signaling can indicate to the UE that compact measurement reports should no longer be sent. Alternatively, the sending of compact measurement reports can be timed out or halted when an event, such as a signaling event, occurs.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur due to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

FIG. 1 is a schematic illustration of a wireless communication system 100 within which aspects may be implemented. The various concepts presented throughout this disclosure may be implemented across a broad variety of telecommunication systems such as wireless communications system 100, network architectures, and communication standards. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a scheduling entity, a RAN entity, or a RAN node, a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs 106 may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Fifth generation (5G) wireless communication networks, such as the New Radio (NR) wireless communication network, support communication between a base station 108 and high-end UEs 106 for a plurality of different usage cases, including, for example, enhanced mobile broadband (eMBB) and ultra-reliable and low latency communication (URLLC). NR networks may further support communication between a base station and low-end UEs 106 in massive machine-type communication (mMTC) usage cases. In some examples, LTE-M or Narrowband Internet of Things (NB-IoT) technology may be utilized to meet the requirements of mMTC.

In addition to providing services to high-end UEs 106 (e.g., via eMMB and/or URLLC) and low-end UEs 106 (e.g., via mMTC), NR networks may further provide services to reduced capability UEs 106. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

The particular services (e.g., eMBB/URLLC/mMTC/reduced capability) provided to a UE may be determined based on a UE category of the UE. UE category information is used to enable the base station to effectively communicate with each UE served by the base station. For example, the UE category may identify the uplink and downlink performance capability of the UE. As an example, the UE category may specify the maximum data rate supported by the UE, the number of component carriers and multiple-input multiple-output (MIMO) layers supported by the UE, and/or the highest modulation supported by the UE. The examples presented herein of UE category differentiators are merely exemplary, and it should be understood that any suitable differences between UE features, whether in hardware or software, may be utilized to differentiate between UE categories.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in device-to-device (D2D) fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per subcarrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
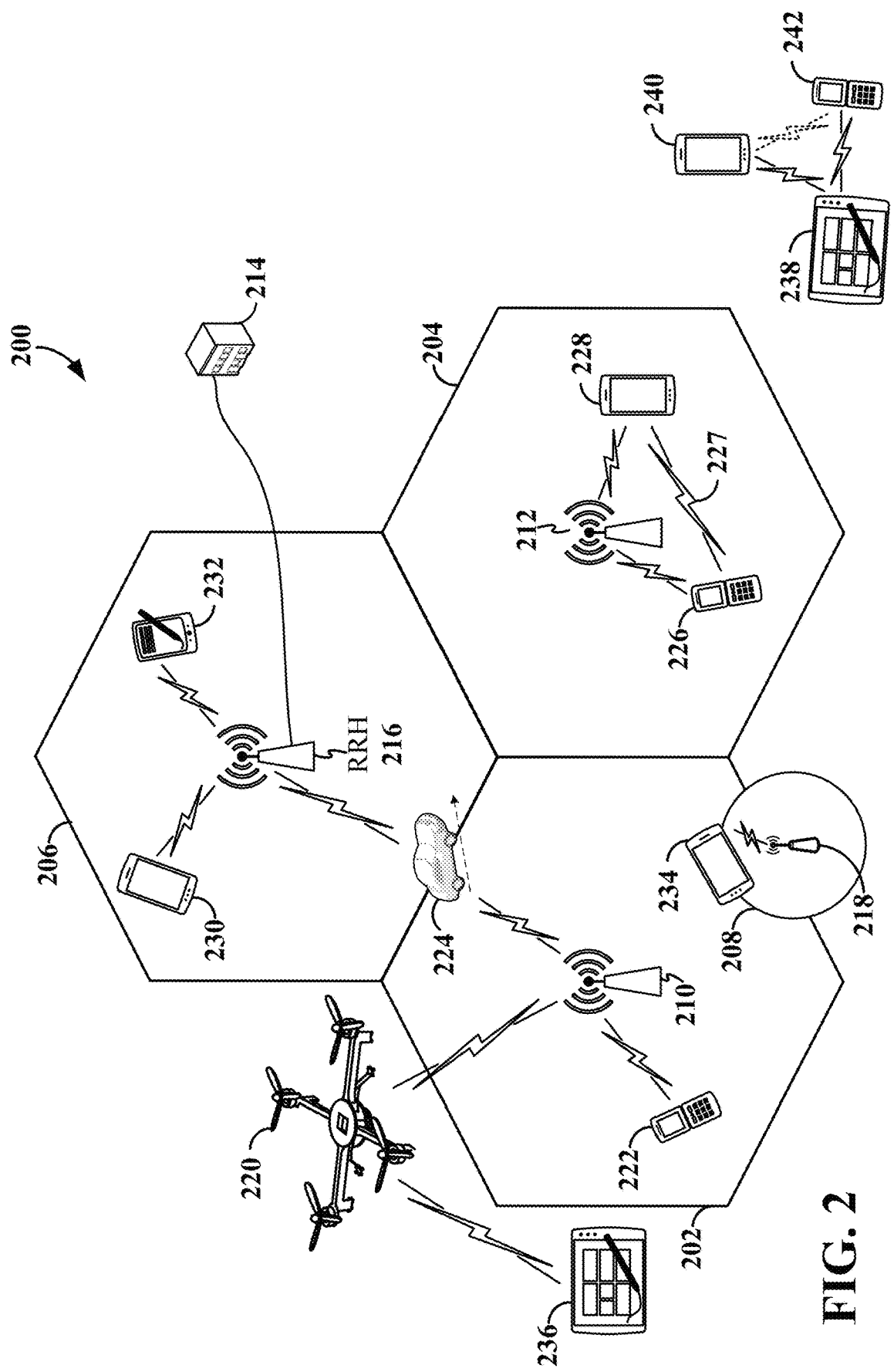
FIG. 2 is a conceptual illustration of an example of a radio access network (RAN) within which aspects may be implemented.

FIG. 2 is a conceptual illustration of an example of a radio access network (RAN) 200 within which aspects may be implemented. By way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
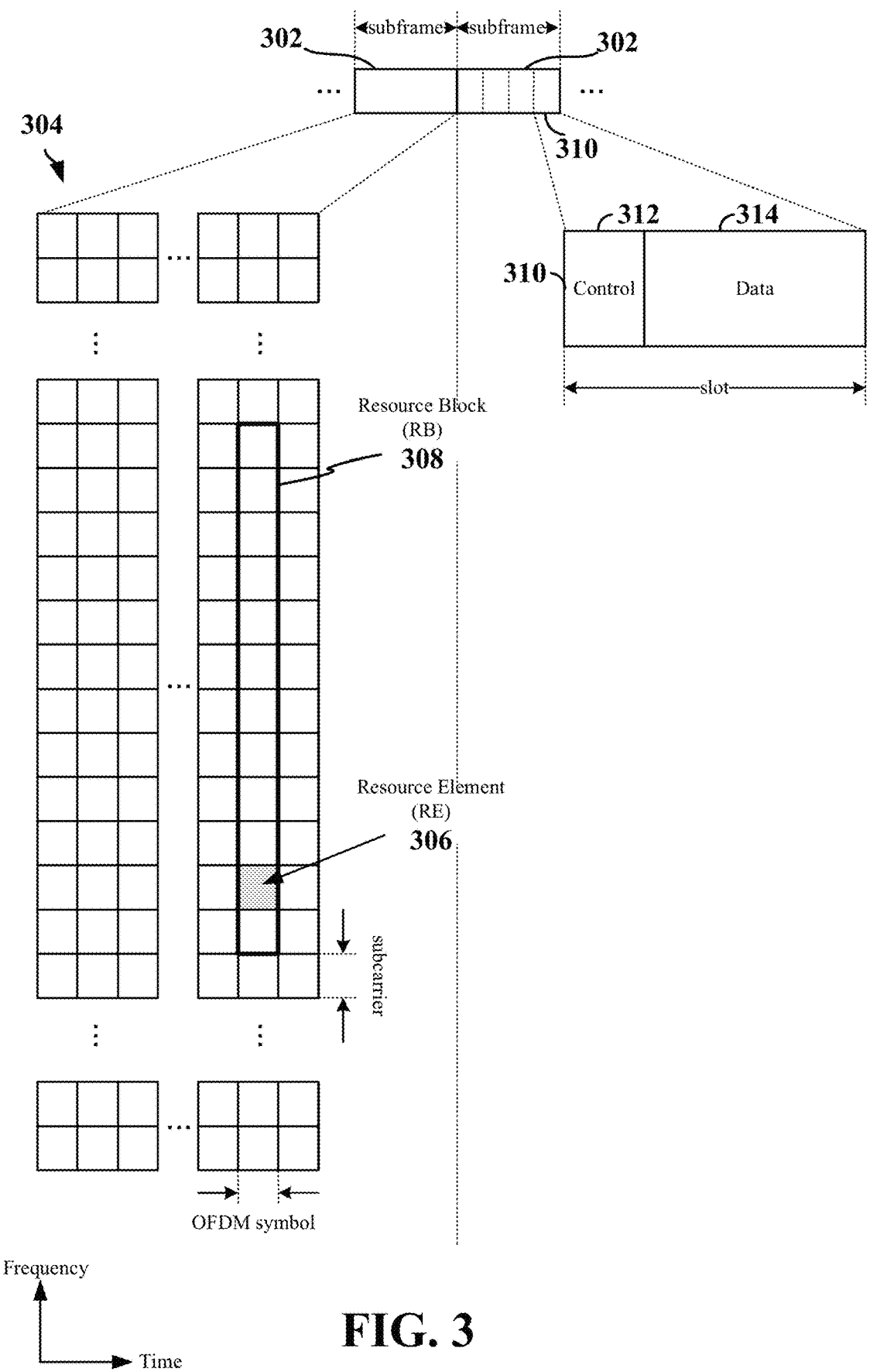
FIG. 3 is a diagram illustrating an example of a frame structure for use in a radio access network within which aspects may be implemented.

FIG. 3 is a diagram illustrating an example of a frame structure for use in a radio access network within which aspects may be implemented. An expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB 1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

To select one or more beams for communication between a base station and a UE, the base station may transmit a reference signal, such as a synchronization signal block (SSB) or a channel state information (CSI) reference signal (CSI-RS), on a plurality of beams in a beam sweeping manner. The UE can perform one or more measurements on the received beams and return a Layer 1 (L1) measurement report including the beam measurements of one or more of the measured beams. For example, the beam measurements may include a reference signal received power (RSRP) or signal-to-interference-plus-noise ratio (SINR).

Figure 4:
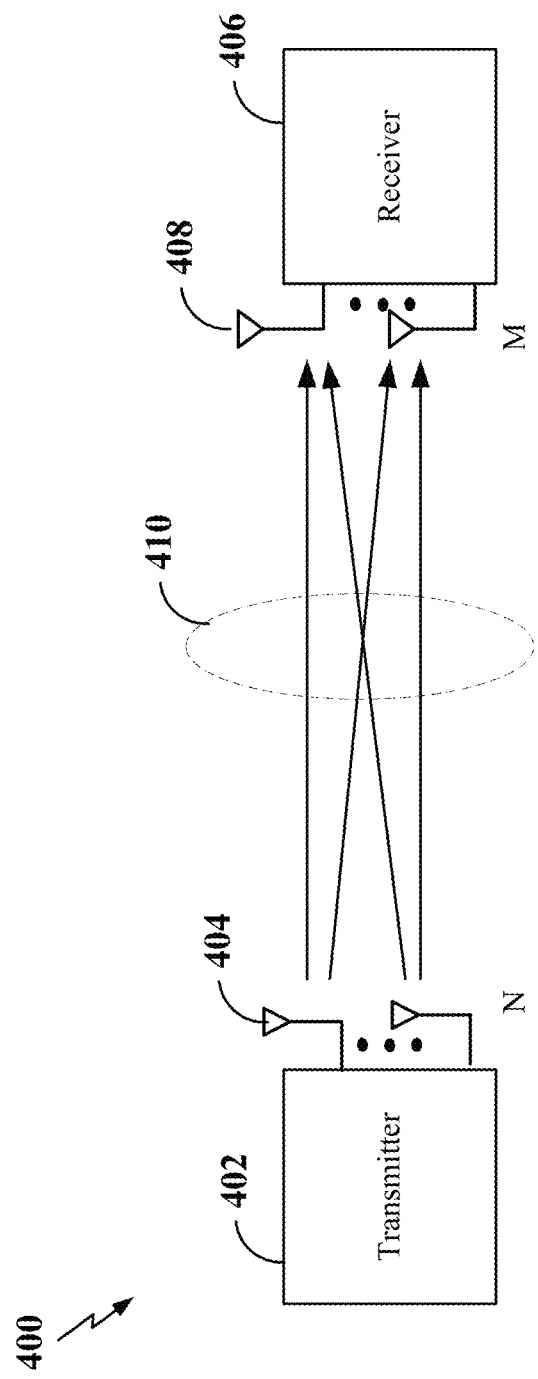
FIG. 4 is a block diagram illustrating a wireless communication system supporting beamforming and/or multiple-input multiple-output (MIMO) communication and within which aspects may be implemented.

FIG. 4 is a block diagram illustrating a wireless communication system supporting beamforming and/or multiple-input multiple-output (MIMO) communication and within which aspects may be implemented. In some aspects of the disclosure, the scheduling entity and/or scheduled entity may be configured for beamforming and/or multiple-input multiple-output (MIMO) technology. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable UE.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 5:
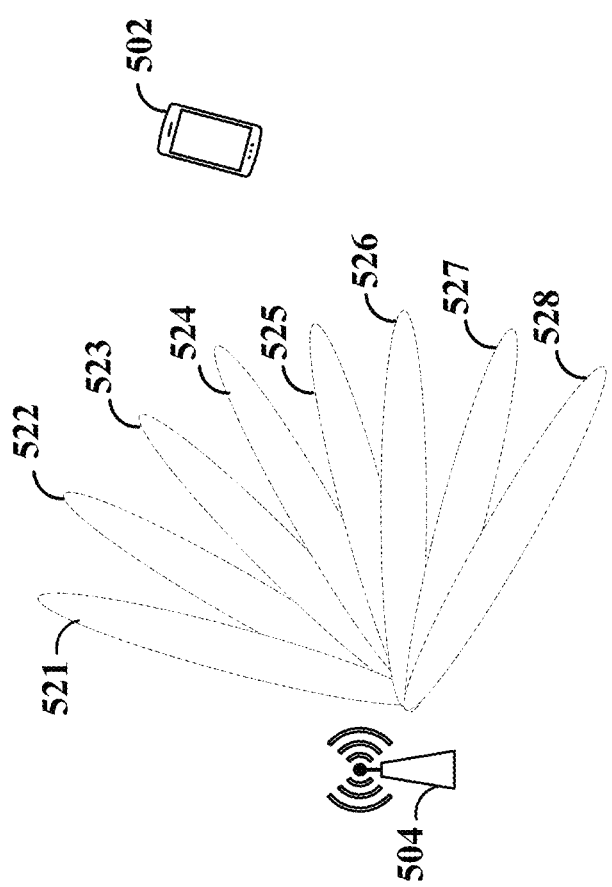
FIG. 5 is a diagram illustrating an example of communication between a radio access network (RAN) node and a user equipment (UE) using beamforming and within which aspects may be implemented.

FIG. 5 is a diagram illustrating an example of communication between a radio access network (RAN) node 504 and a user equipment (UE) 502 using beamforming and within which aspects may be implemented. The RAN node 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as a SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The UE 502 searches for and identifies the beams based on the beam reference signals. The UE 502 then performs beam measurements (e.g., RSRP, SINR, RSRQ, etc.) on the beam reference signals to determine the respective beam quality of each of the beams. In examples in which the UE 502 is in a RRC connected state, the UE 502 may generate and transmit an L1 measurement report, including the respective beam identifier (beam index) and beam measurement of one or more of the beams 521-528 to the RAN node 504. The RAN node 504 may then determine the downlink beam (e.g., beam 524) on which to transmit unicast downlink control information and/or user data traffic to the UE 502. In some examples, the selected downlink beam has the highest gain from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the UE 502. In some examples, the RAN node 504 may derive the downlink beam based on a combination of the L1 measurement report and uplink measurements.

In examples in which the UE 502 is in a RRC idle state, the UE 502 may use the beam measurements to select a downlink beam on which to receive broadcast communications from the RAN node 504. The broadcast communications may include, for example, paging messages transmitted from the RAN node 504 to the UE 502 when new data arrives for the UE 502 at the network. In some examples, a paging message may be broadcast by the RAN node 504 over multiple downlink beams. The paging message may then be received by the UE 502 on the selected downlink beam.

In addition to L1 measurement reports, the UE 502 can further utilize the beam reference signals to estimate the channel quality of the channel between the RAN node 504 and the UE 502. For example, the UE may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

The RAN node 504 and UE 502 may support different types of CSI reports (including L1 measurement reports) and/or different types of measurements. For example, self-contained CSI (e.g., CSI is transmitted back to the RAN node 504 in the same slot as the CSI-RS is transmitted from the RAN node) or non-self-contained CSI (e.g., CSI is transmitted back to the RAN node 504 in a later slot than the slot in which the CSI-RS is transmitted from the RAN node) may be supported. To distinguish between the different report/measurement types and measurement configurations, CSI-RS pilots may be mapped to specific resource elements (REs) and ports for each of the report/measurement types and report/measurement configurations.

Figure 6:
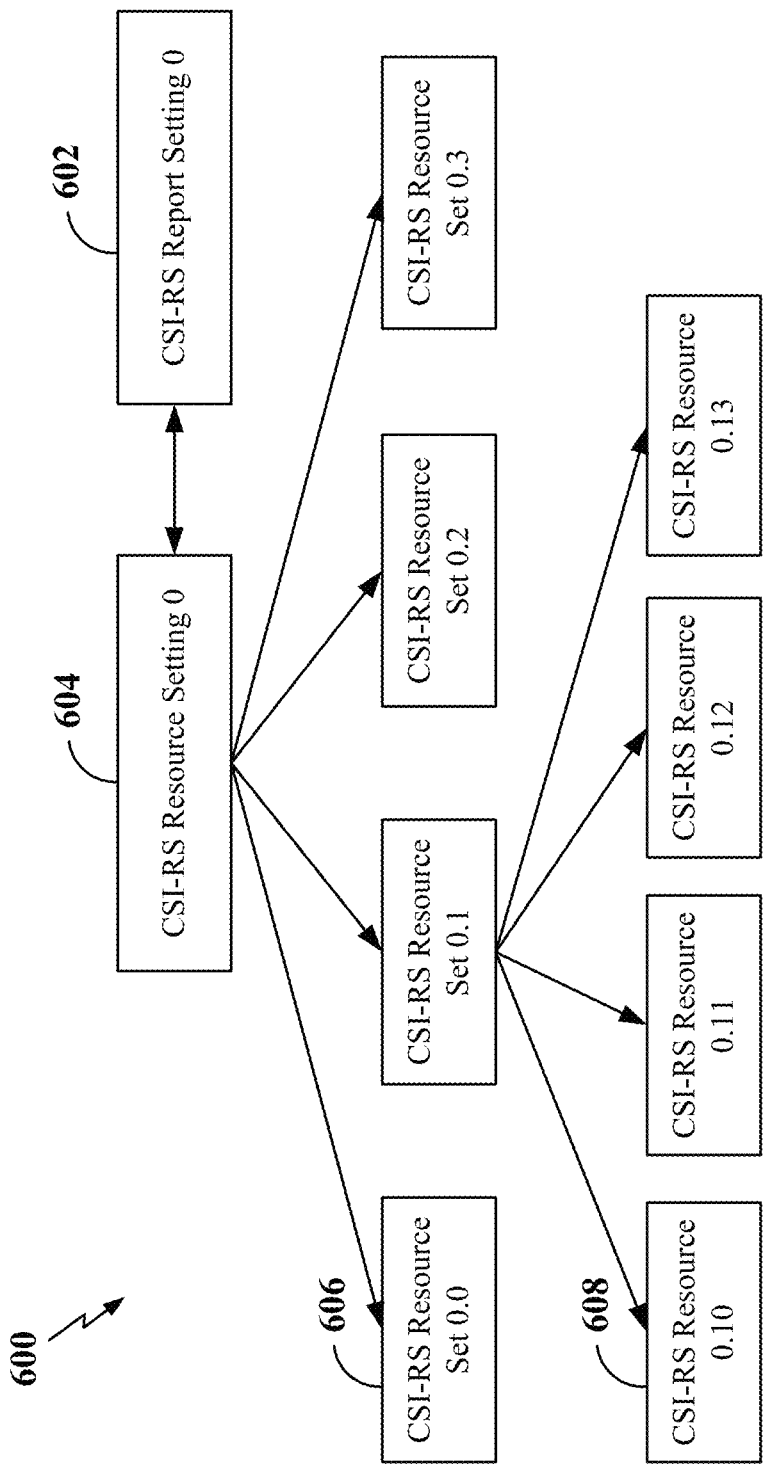
FIG. 6 is a diagram illustrating an example of channel state information (CSI) resource mapping within which aspects may be implemented.

FIG. 6 is a diagram illustrating an example of channel state information (CSI) resource mapping within which aspects may be implemented. An exemplary CSI resource mapping 600 can be used to support different report/measurement configurations. The CSI resource mapping includes CSI report setting 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI resource setting 0) is illustrated. However, it should be understood that any suitable number of CSI resource settings 604 may be supported.

Each CSI report setting 602 may include a reportQuantity that indicates, for example, the specific CSI parameters and granularity thereof (e.g., wideband/sub-band CQI, PMI, RI, LI, etc.), or L1 parameters (e.g., L1-RSRP, L1-SINR) to include in a CSI report. The CSI report setting 602 may further indicate a periodicity of the CSI report. For example, the CSI report setting 602 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 602 may further include a respective priority and other suitable parameters.

Each CSI report setting 602 may be linked to a CSI resource setting 604. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource settings 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters.

Each CSI resource 608 indicates the particular beam (e.g., ports), frequency resource, and OFDM symbol on which the reference signal may be measured by the UE. For example, each CSI-RS resource 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

A RAN node may configure a UE with one or more CSI report settings 602 and CSI resource settings 604 via, for example, radio resource control (RRC) signaling. For example, the RAN node may configure the UE with a list of periodic CSI report settings 602 indicating the associated CSI resource set 606 that the UE may utilize to generate periodic CSI reports. As another example, the RAN node may configure the UE with a list of aperiodic CSI report settings in a CSI-AperiodicTriggerStateList. Each trigger state in the CSI-AperiodicTriggerStateList may include a list of aperiodic CSI report settings 602 indicating the associated CSI resource sets 606 for channel (and optionally interference) measurement. As another example, the RAN node may configure the UE with a list of semi-persistent CSI report settings in a CSI-SemiPersistentOnPUSCH-TriggerStateList. Each trigger state in the CSI-SemiPersistentOnPUSCH-TriggerStateList may include one CSI report setting 602 indicating the associated CSI resource set 606. The RAN node may then trigger one or more of the aperiodic or semi-persistent trigger states using, for example, DCI. As indicated above, a MAC-CE may be used to activate or deactivate a semi-persistent CSI report setting 602 for a CSI report sent on the PUCCH.

For L1-RSRP measurement reports, the UE may be configured with a CSI resource setting 604 having up to sixteen CSI resource sets 606. Each of the CSI resource sets 606 may include up to sixty-four CSI resources 608 in each set. The total number of different CSI resources 608 over all the CSI resource sets 606 may be no more than 128. For L1-SINR measurement reports, the UE may be configured with a CSI resource setting 604 that can include up to 64 CSI resources 608 (e.g., up to 64 CSI-RS resources or up to 64 SSB resources). In examples in which the UE includes two antenna panels, and therefore, is capable of measuring two beams at a time, the UE may be configured for group-based beam reporting in which the UE may measure beams from different transmission and reception points (TRPs). In this example, a single L1 measurement report may include measurements from both TRPs (e.g., the best beam (highest RSRP or SINR) from a first TRP and the best beam from a second TRP). Here, the different CSI-RS or SSB beams from each TRP may be received and measured simultaneously.

Aspects of the present disclosure generally relate to reducing the size of measurement reports, particularly Layer 1 (L1) measurement reports reporting beam measurements such as reference signal received power (RSRP) or signal-to-interference-plus-noise ratio (SINR). The configurations of the measurement reports, often called report settings, can indicate the number of bits with which to report the beam measurements and the resource indicators. Some measurement reports, such as L1-RSRP and L1-SINR can be standardized and have 35 bit payloads. Every measurement that is transmitted consumes resources. Reduced payloads can result in more measurement reports being reliably sent.

Particular aspects of the subject matter described in this disclosure can be implemented to one or more of the following potential advantages. In some aspects the measurement reports can use alternative beam indexing. A measurement report can use beam index numbers to reference resource indicators instead of using the resource indicators. A beam index number indicates a position in a list of resource indicators in a reference set. The reference set can a previously transmitted measurement report that used resources indicators or a preconfigured reference set already stored in the user equipment (UE) and radio access network (RAN) node. For example, an L1-SINR measurement report can report four beam measurements with each resource indicator using four bits. That L1-SINR measurement report therefor uses a total of sixteen bits for resource indicators. That L1-SINR can be a reference set having four positions with a resource indicator in each of the four positions. A two bit beam index number can indicate any one of those four positions and thereby indicate any one of those four resource indicators.

The present disclosure details compact measurement reports that use beam index numbers. A compact L1-SINR measurement report using the previously discussed L1-SINR measurement report as a reference set can report four beam measurements with each beam index number using two bits. That compact L1-SINR measurement report therefor uses a total of eight bits to indicate four resource indicators, a 50% reduction from sixteen bits. In many scenarios, such as before handoff or handover, frequent and periodic measurement reports may need to be reliably communicated. In such scenarios, radio resource control (RRC) signaling can indicate to a user equipment (UE) that compact measurement reports are to be periodically transmitted. At a later time, when the periodic measurement reports are no longer desired, RRC signaling can indicate to the UE that compact measurement reports should no longer be sent. Alternatively, the sending of compact measurement reports can be timed out or halted when an event, such as a signaling event, occurs.

Figure 7:
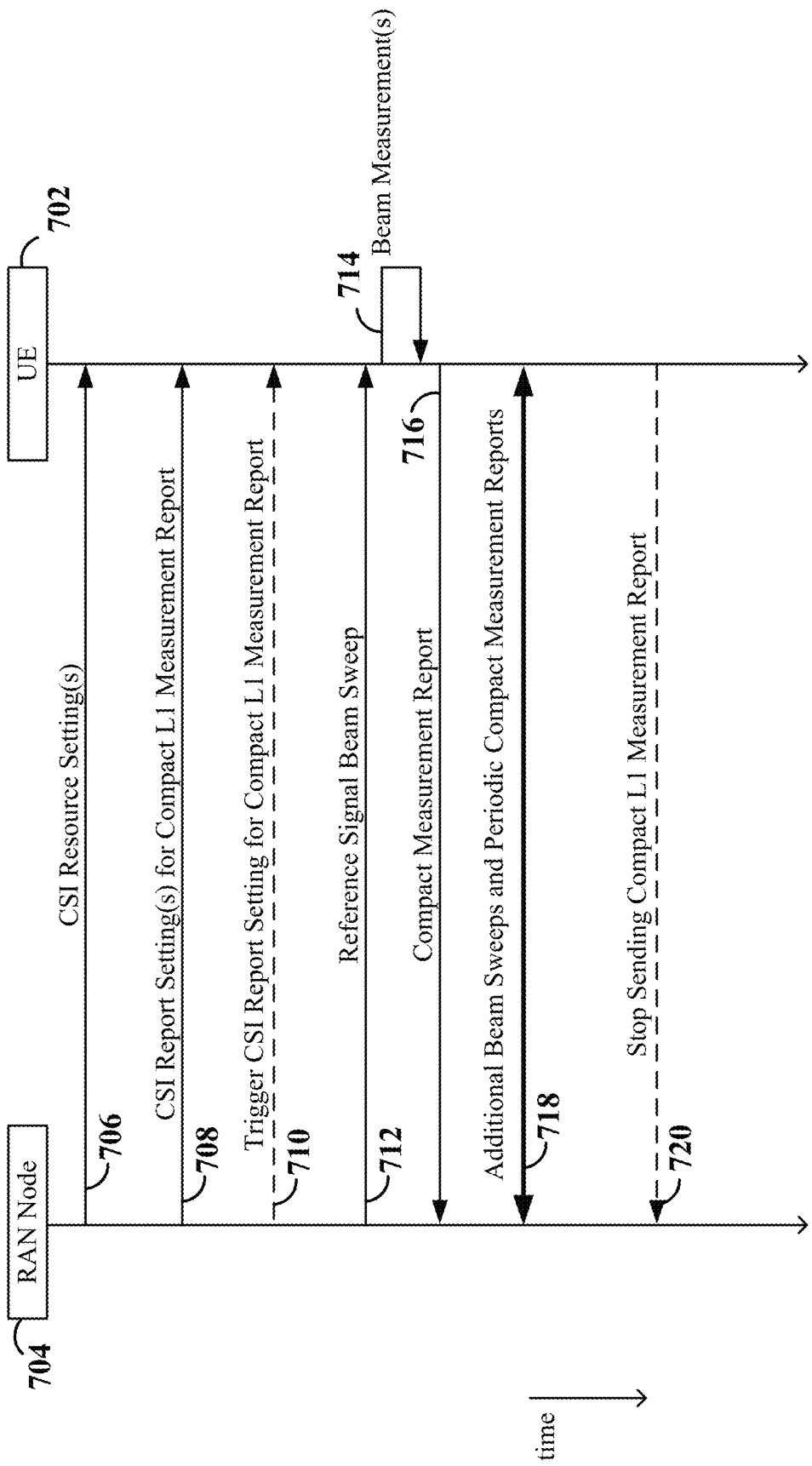
FIG. 7 is a diagram illustrating an example of signaling between a user equipment (UE) and a RAN node according to some aspects.

FIG. 7 is a diagram illustrating an example of signaling between a UE 702 and a RAN node 704 according to some aspects. The UE 702 may correspond to any of the UEs or scheduled entities shown in FIGS. 1, 2, 4, and/or 5. In addition, the RAN node 704 may correspond to any of the base stations (e.g., gNB, eNB, or TRP) or scheduling entities shown in FIGS. 1, 2, 4, and/or 5.

At 706 and 708, the RAN node 704 can transmit one or more CSI resource setting(s) and one or more CSI report setting(s) to the UE 702 to configure the UE with the one or more CSI report setting(s) and associated CSI resource setting(s). In some examples, the CSI report setting(s) and associated CSI resource setting(s) may be transmitted to the UE via RRC signaling. The CSI report settings can be for compact measurement reports.

In examples in which the CSI report setting(s) include periodic L1 compact measurement report setting(s), the UE may utilize the periodic L1 compact measurement report setting(s) to generate corresponding measurement reports. In examples in which the CSI report setting(s) include aperiodic or semi-persistent L1 compact measurement report setting(s), at 710, the RAN node 704 may trigger an aperiodic or semi-persistent L1 compact measurement report setting via, for example, DCI or a MAC-CE.

At 712, the RAN node 704 can perform a beam sweep to transmit a reference signal (e.g., a SSB or CSI-RS) on each of a plurality of beams to the UE 702. At 714, the UE 702 identifies and measures the RSRP or SINR of a respective beam reference signal on one or more configured beams (e.g., based on the CSI resources in the CSI resource set(s) associated with the CSI report setting).

At 716, the UE 702 can transmit a compact measurement report (e.g., L1-RSRP or L1-SINR for SSB or CSI-RS) to the RAN node 704 in accordance with the CSI report setting(s). For a particular CSI report setting, up to four L1 measurements (e.g., up to four different beams) may be included in the compact measurement report. The largest measured value may be quantized to seven bits and may be absolute. Absolute means that the quantized measured value is reported. For L-RSRP or L1-SINR measurement reports or if group-based beam reporting is enabled, each of the other included measurements (up to three measurements) in the measurement report may be differential measurements (with respect to the largest measured value) that are quantized to four-bit values. The beam measurements for multiple CSI report settings may be sent in a single PUCCH/PUSCH payload (e.g., a single L1 measurement report). The number of CSI report settings may be limited though by the PUCCH/PUSCH payload size. For example, if the payload size is not sufficient to carry all of the CSI report settings, CSI report settings with the lowest priority may be dropped.

However, for stationary reduced capability devices, such as industrial sensors and video surveillance cameras, the channel conditions may not vary frequently. Therefore, the beam(s) and the order of the beams in the measurement report(s) may not change often. Various aspects of the disclosure relate to reducing the payload size for measurement reports. A reduction in measurement report payload size can improve reporting coverage by maximizing the number of CSI report settings that may be sent in a PUCCH/PUSCH payload. In addition, reducing the measurement report payload size can enable a reduction in the amount of repeated information (e.g., CRI/SSBRI) included in each measurement report.

At 718, the RAN node continues sending reference signal beam sweeps, the UE continues measuring the beams, and the UE continues sending compact measurement reports. Here, the UE is periodically sending compact measurement reports until an exit condition is met. The exit condition can be an indication sent from the RAN node 704 indicating that the UE stop sending compact L1 measurement reports 720. Alternatively, the UE can be configured to send the compact measurement reports for a specific time period or until a signaling event occurs. Handoff and handover are examples of signaling events. Handoff occurs when the UE is handed off to a different RAN node. Handover occurs when the UE is switched to a different channel.

FIGS. 8A, 8B, and 8C are diagrams illustrating examples of various configurations of measurement reports according to some aspects. In the example shown in FIG. 8, measurement report configuration 802a uses resource indicators to indicate which beam each of the reported measurements is for. Compact measurement report configuration 802b is similar to measurement report configuration 802a except that compact measurement report configuration 802c uses beam index numbers to indicate which beam each of the reported measurements is for. Compact measurement report configuration 802c is similar to compact measurement report configuration 802b except that there are only two reported beam measurements in compact measurement report configuration 802c. Measurement reports, including compact measurement reports, can be specified or configured via CSI-RS report settings, as discussed above. A measurement report can alternatively be specified or configured by setting the report configuration in some other way such as by loading the configuration into non-transient memory during manufacture of the UE or at some other point in the supply chain that delivers the UE to a user.

Measurement report configuration 802a can provide measurement data for four beam measurements. The CRIs 804a, 808a, 812a, 816a are specified as having four bits and can therefore each indicate one of sixteen beams CRI 1 is the CRI of the beam with the reported value in measurement 1 806a. CRI 2 is the CRI of the beam with the reported value in measurement 2 808a. CRI 3 is the CRI of the beam with the reported value in measurement 3 810a. CRI 4 is the CRI of the beam with the reported value in measurement 4 812a.

The beam measurements in measurement report configuration 802a uses seven bits for a first beam 806a, four bits for a second beam 810a, four bits for a third beam 814a, and four bits for a fourth beam 818a. A seven bit integer can have one of 127 values and a four bit integer can have one of sixteen integral values. A beam measurement reported with seven bits can be the seven bit integral value multiplied by a quantization level. In general, a reported beam measurement using N bits can be the N bit integral value multiplied by a quantization level. For L-RSRP or L1-SINR measurement reports, the quantization level can be expressed in decibels (dB).

The first reported beam measurement 806a in configuration 802a is specified as an absolute seven bit reported beam measurement. The second reported beam measurement 808a, third reported beam measurement 810a, and fourth reported beam measurement 812a in configuration 802a are specified as differential four bit reported beam measurements referencing the first reported beam measurement 806a. In one non-limiting example of SINR measurements using a 0.5 dB quantization level, the first reported beam measurement 806a is "0000111" and the second reported beam measurement 810a is "0011". In this example, "0000111" has the integral value 7 and "0011" has the integral value 3. The first reported beam measurement 806a is therefore 7*0.5 db=3.5 dB SINR. The second reported beam measurement 810a is therefore (7−3)*0.5 db=2.0 db. The first reported beam measurement 806a often reports the highest beam measurement (often called the best beam) while the remaining reported measurements are, in order, the second highest, third, highest, etc.

The FIG. 8B measurement report configuration is a compact measurement report configuration 802b using beam index numbers to indicate which beam each of the reported measurements is for. The beam index numbers 804b, 808b, 812b, 816b are specified as having two bits and can therefore each indicate one of four CRIs in a reference set. The L1 measurement report 802a can be that reference set. For example, beam index number 1 can be 3 ("11" in binary) and can therefore reference CRI 4. Note that enumerating the CRI position in the reference set begins with zero and, as such, CRI 1 is in position zero, CRI 2 is in position 1, etc. Each compact measurement report has a reference set. The reference set can be a measurement report previously transmitted by the UE to the RAN node and that used CRIs associated with reported beam measurements. Examples of measurement reports that can be used as reference sets include the most recent L1 measurement report transmitted by the UE and a measurement report transmitted by the UE at a specific time.

Beam index number 1 804b is associated with reported measurement 806b, which is the reported beam measurement for the CRI in the position in the reference set indicated by beam index number 1 804b. Beam index number 2 808b is associated with reported measurement 810b, which is the reported beam measurement for the CRI in the position in the reference set indicated by beam index number 2 808b. Beam index number 3 812b is associated with reported measurement 814b, which is the reported beam measurement for the CRI in the position in the reference set indicated by beam index number 3 812b. Beam index number 4 816b is associated with reported measurement 818b, which is the reported beam measurement for the CRI in the position in the reference set indicated by beam index number 4 816b.

Compact measurement report configuration 802c is similar to compact measurement report configuration 802b except that there are only two reported beam measurements in compact measurement report configuration 802c. As such beam index number 1 804c is associated with reported measurement 806c, which is the reported beam measurement for the CRI in the position in the reference set indicated by beam index number 1 804c. Beam index number 2 808c is associated with reported measurement 810c, which is the reported beam measurement for the CRI in the position in the reference set indicated by beam index number 2 808c.

Figure 9A:
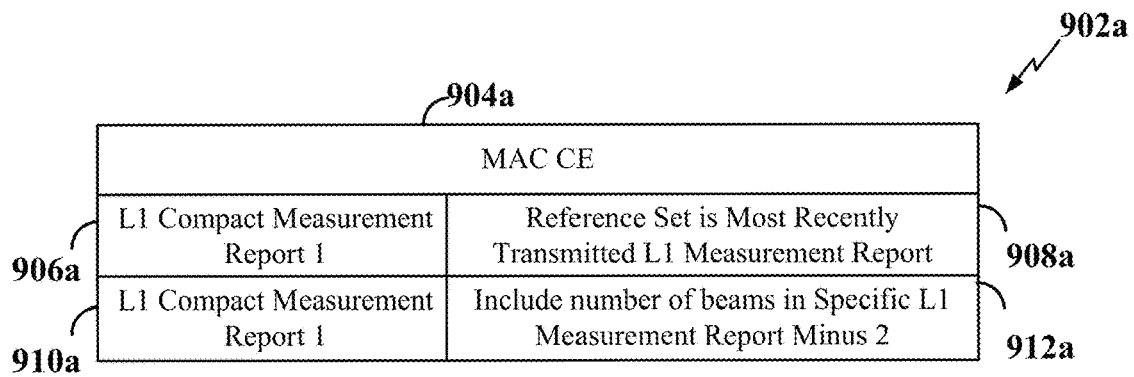
FIGS. 9A, 9B, and 9C are conceptual diagrams illustrating examples of indications indicating compact measurement report configurations according to some aspects.
Figure 9B:
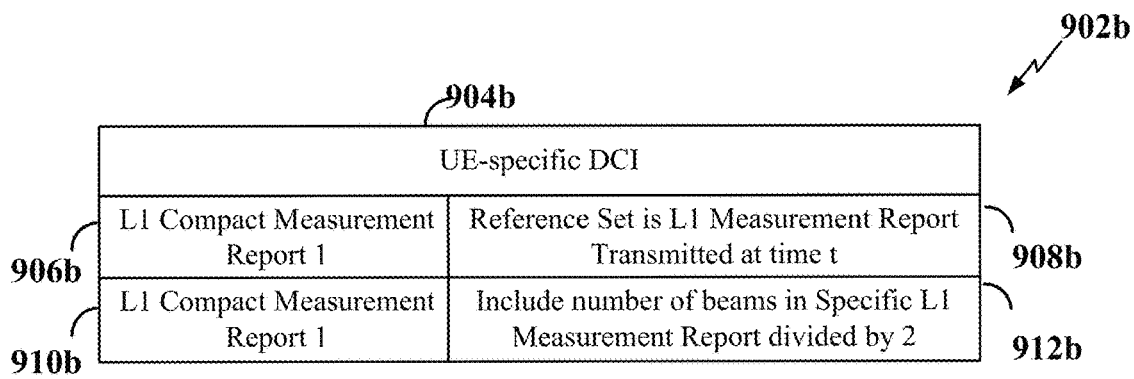
Figure 9C:
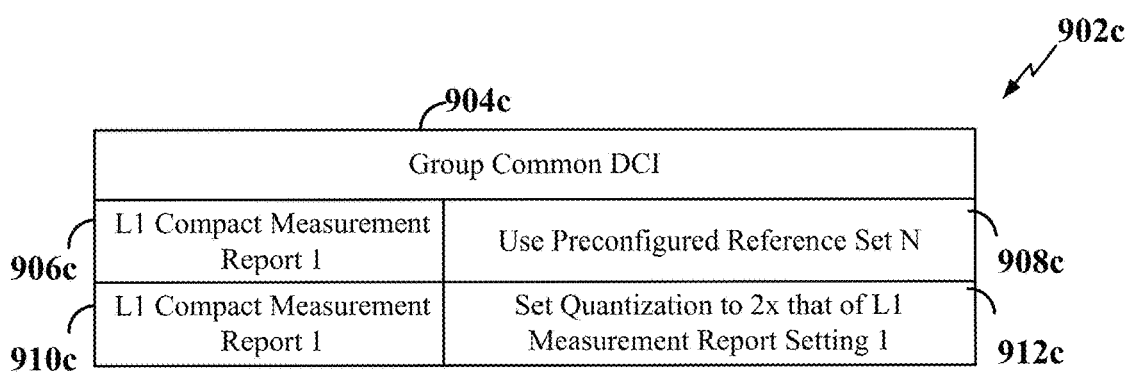

FIGS. 9A, 9B, and 9C are conceptual diagrams illustrating examples of indications indicating compact measurement report configurations according to some aspects. An indication 902a can be transmitted by a RAN node to a UE in a MAC CE 904a. Indication 902a indicates to the UE that L1 compact measurement report 1 906a is to use as its reference set the most recently transmitted measurement report that used CRIs 908a. Indication 902a indicates to the UE that the contents of L1 compact measurement report 1 910a include only the number of beams in a specified measurement report minus two 912a.

An indication 902b can be transmitted by a RAN node to a UE in a UE-specific DCI 904b. A UE-specific DCI is a DCI for a specific UE. Indication 902b indicates to the UE that L1 compact measurement report 1 906b is to use as its reference set the measurement report transmitted by the UE at time t 908b, which is a time the UE can use to identify a specific measurement report. Indication 902b also indicates to the UE that the contents of L1 compact measurement report 1 910b include only half the number of beams that are in a specified measurement report 912b.

An indication 902c can be transmitted by a RAN node to a UE in a group common DCI 904c. A group common DCI is sent to many UEs. Indication 902c indicates to the UE that L1 compact measurement report 1 906c is to use as its reference set the preconfigured reference set N 908c. The UE can be configured with reference set by, for non-limiting example, installing the reference sets while manufacturing the UE, while installing software and data on the UE, or via CSI RS dialogs with a RAN.

Indication 902c also indicates to the UE that L1 compact measurement report 1 910c is to be reported with a quantization level that is two times that of L1 measurement report setting 1 912c (e.g. 2×0.5 dB=1.0 dB). The quantization level can also be set in reference to a measurement report transmitted by the UE such as the most recent measurement report or the measurement report transmitted at a specific time.

Figure 10:
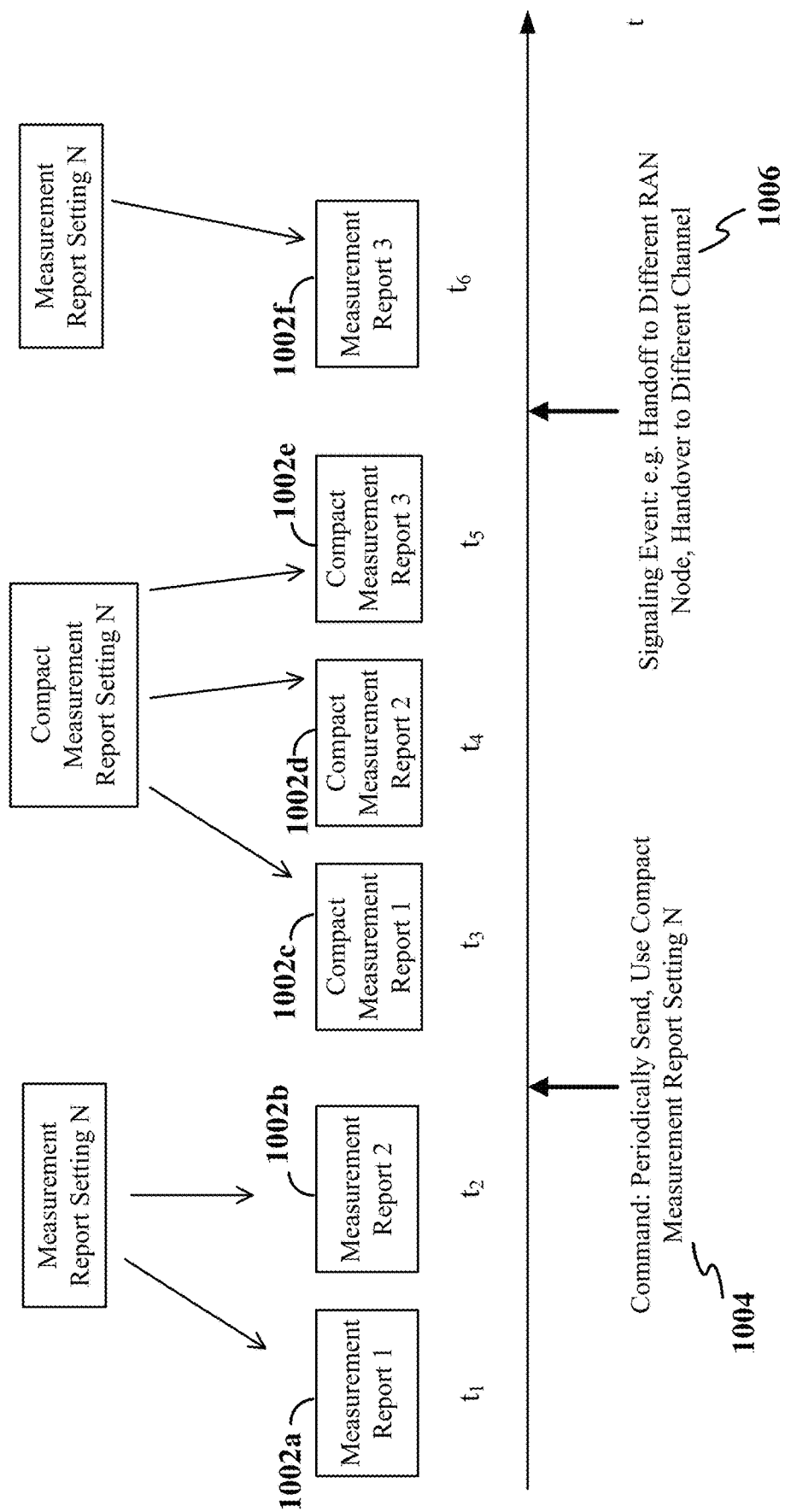
FIG. 10 is a diagram illustrating an example of measurement reports and compact measurement reports sent over time according to some aspects.

FIG. 10 is a diagram illustrating an example of measurement reports and compact measurement reports sent over time according to some aspects. The measurement reports 1002a, 1002b, 1002f are transmitted by the UE to the RAN using measurement report setting N. The compact measurement reports 1002c, 1002d, 1002e are transmitted by the UE to the RAN using compact measurement report setting N. Measurement report 1 1002a is transmitted by the UE at time t=t1. Measurement report 2 1002b is transmitted by the UE at time t=t2. Compact measurement report 1 1002c is transmitted by the UE at time t=t3. Compact measurement report 2 1002d is transmitted by the UE at time t=t4. Compact measurement report 3 1002e is transmitted by the UE at time t=t5. Measurement report 3 1002f is transmitted by the UE at time t=t6. Note that "N" can indicate an integral value in general. As such, Measurement report setting N can be measurement report setting 10, compact measurement report setting N can be compact measurement report setting 4, and preconfigured reference set N can be preconfigured reference set 7.

As seen in FIG. 10, the UE can transmit non-compact measurement reports 1002a, 1002b until it receives an indication to periodically send compact measurement reports 1004. A RAN node may request transient reports at specific intervals while evaluating whether to handoff or handover the UE. The UE then sends compact measurement reports 1002c, 1002d, 1002e until a signaling event, such as handoff or handover, occurs. The UE can be configured to automatically stop sending the compact measurement reports if any one of a number of signaling events occurs.

Figure 11:
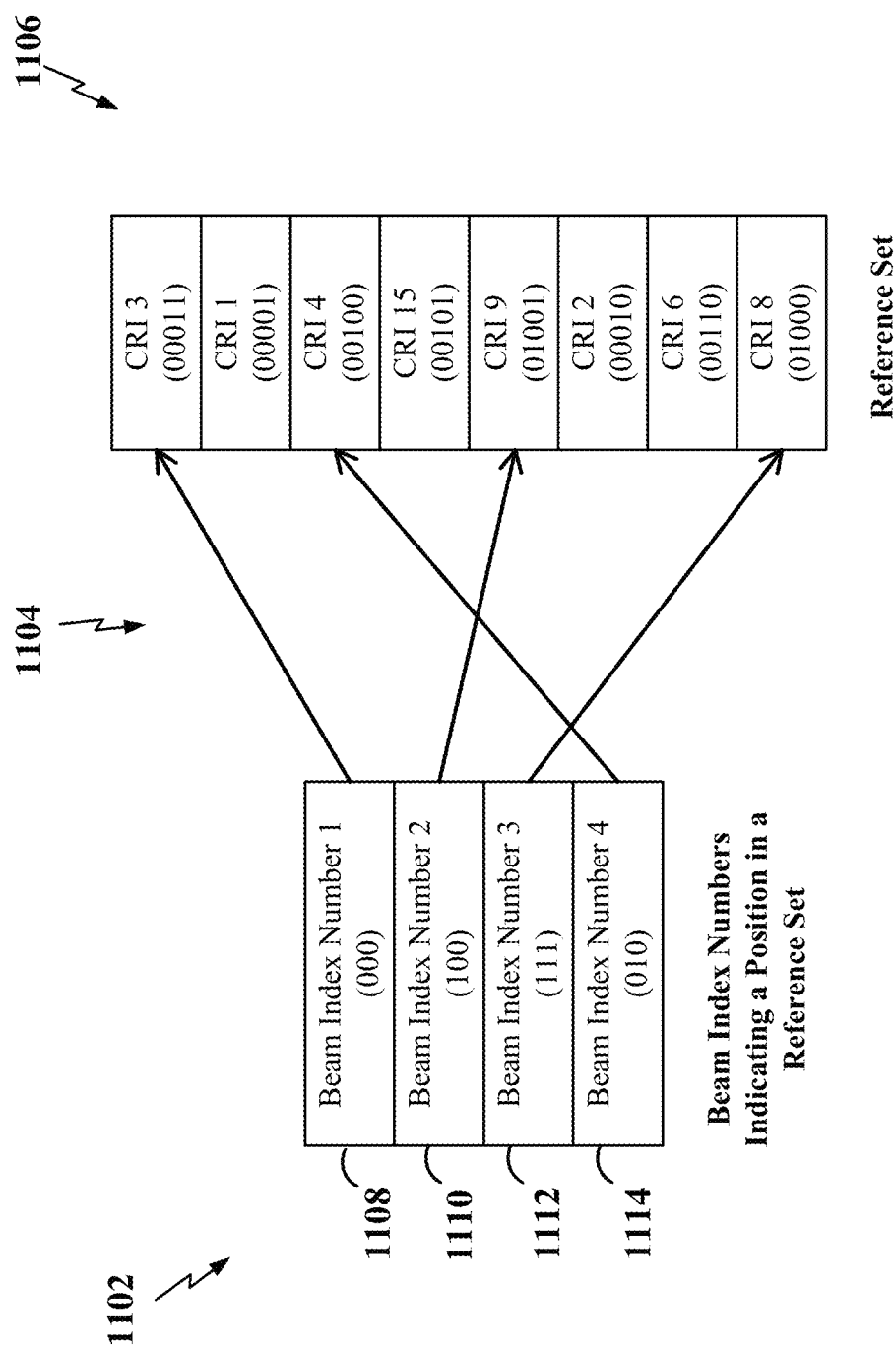
FIG. 11 is a diagram illustrating beam index numbers referring to resource indicators in a reference set according to some aspects.

FIG. 11 is a diagram illustrating beam index numbers referring to resource indicators in a reference set according to some aspects. A reference set 1106 has CRIs in known positions. When a measurement report is used as a reference set, the CRIs can be associated with reported beam measurements and can be ordered such that the beam with the highest measurement is in position 0, the next highest in position 1, and so forth. When using a measurement report as a reference set, the reported measurements can be ignored whereas the positions of the CRIs is important. A reference set can be a preconfigured reference set, as described above. In FIG. 11, the reference set 1106 uses five bits to represent CRIs. As such, there can be 32 CRIs of which eight are in the reference set 1106. The other CRIs can be in other reference sets and those reference sets can have any combination of CRIs positioned in any order. The beam index numbers 1102 use three bits and can thereby refer to each of the positions in an eight-position reference set 1106. A compact measurement report can have a number of beam index numbers 1102 such as beam index number 1 1108, beam index number 2 1110, beam index number 3 1112, and beam index number 4 1114. Beam index number 1 1108 is 0 and therefore refers to CRI 3 which is in position 0 in the reference set 1106. Beam index number 2 1110 is 4 and therefore refers to CRI 9 which is in position 4 in the reference set 1106. Beam index number 3 1112 is 7 and therefore refers to CRI 8 which is in position 7 in the reference set 1106. Beam index number 4 1114. is 2 and therefore refers to CRI 4 which is in position 2 in the reference set 1106. A mapping 1104 from the beam index numbers to the CRIs relates to using the beam index numbers 1102 to locate positions in the reference table 1106 and to thereby associate one of the CRIs with each of the reported beam measurements in a compact measurement report. A compact measurement report using three bit beam index numbers instead of five bit CRIs saves two bits per reported beam measurement. When four SINR or four RSRP beam measurements are reported, the savings is eight bits.

Figure 12:
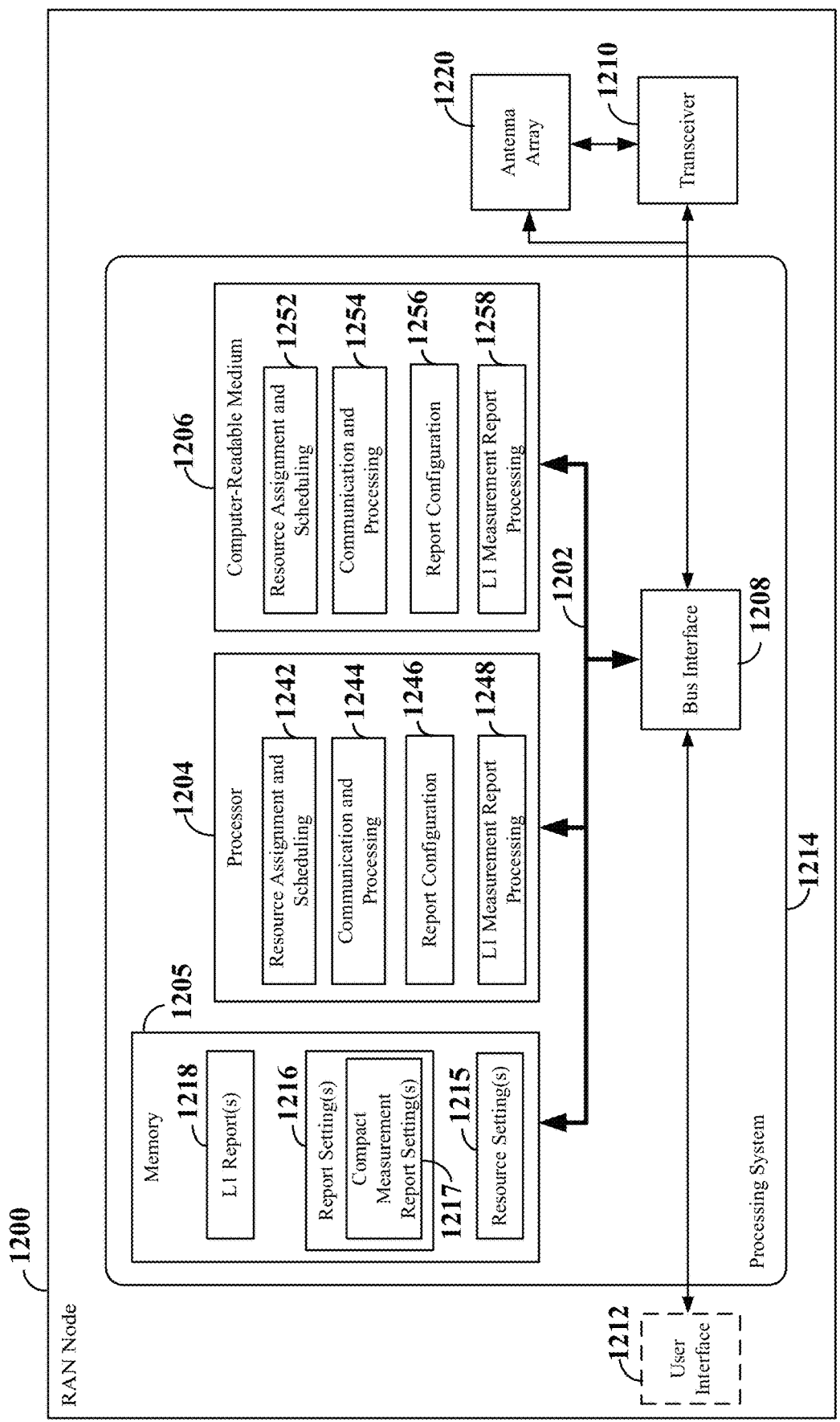
FIG. 12 is a block diagram illustrating an example of a hardware implementation for a RAN node employing a processing system according to some aspects.

FIG. 12 is a block diagram illustrating an example of a hardware implementation for a RAN node 1200 employing a processing system 1214 according to some aspects. For example, the RAN node 1200 may be a base station (e.g., gNB) or other scheduling entity as illustrated in any one or more of FIGS. 1, 2, 4, 5, and/or 7.

The RAN node 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1200 may be configured to perform any one or more of the functions described herein. That is, the processor 1204, as utilized in a RAN node 1200, may be used to implement any one or more of the processes described below. The processor 1204 may in some instances be implemented via a baseband or modem chip and in other implementations, the processor 1204 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202, a transceiver 1210, and an antenna array 1220. Transceiver 1210 can be a wireless transceiver. The antenna array 1220 may be a single panel antenna array or a multi-panel antenna array. The transceiver 1210 provides a means for communicating with various other apparatus over a transmission medium (e.g., air interface). A user interface 1212 (e.g., keypad, display, touchscreen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. In some examples, the computer-readable medium 1206 may be part of the memory 1205. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include resource assignment and scheduling circuitry 1242, configured to generate, schedule, and modify a resource assignment or grant of time-frequency resources. For example, the resource assignment and scheduling circuitry 1242 may schedule time-frequency resources within a plurality of sub-bands or BWPs of one or more subframes or slots to carry user data traffic and/or control information to and/or from multiple UEs.

In various aspects of the present disclosure, the resource assignment and scheduling circuitry 1242 may be configured to schedule resources for the transmission of one or more RRC messages including one or more resource settings 1215 (e.g., CSI resource settings) and one or more report settings 1216 (e.g., CSI report settings) to one or more UEs for configuration of respective resource settings and respective report settings on each of the UEs. The resource settings 1215 and report settings 1216 may be maintained, for example, in memory 1205. The resource assignment and scheduling circuitry 1242 may further be configured to schedule resources for the transmission of an activation or deactivation message (e.g., via a MAC-CE) to a UE to activate or deactivate a semi-persistent report setting associated with PUCCH reporting. In addition, the resource assignment and scheduling circuitry 1242 may be configured to schedule resources for the transmission of a trigger message (e.g., via DCI) to a UE to trigger an aperiodic or semi-persistent report setting associated with PUSCH reporting. Furthermore, the resource assignment and scheduling circuitry 1242 may be configured to schedule resources for the transmission of report information associated with an aperiodic report setting (e.g., via the DCI containing the trigger message or a different message) to a UE to indicate a list and/or order of beam measurements to include in an aperiodic L1 measurement report.

The resource assignment and scheduling circuitry 1242 may further be configured to schedule resources for the periodic, aperiodic, and/or semi-persistent transmission of a plurality of reference signals on a plurality of beams. For example, the reference signals may include SSBs and/or RSs. The resource assignment and scheduling circuitry 1242 may further be configured to schedule resources for the transmission of one or more uplink L1 measurement reports 1218 on one or more PUCCH or PUSCH. The received uplink L1 measurement report(s) 1218 received from UEs may be stored, for example, in memory 1205. The resource assignment and scheduling circuitry 1242 may further be configured to execute resource assignment and scheduling software 1252 stored in the computer-readable medium 1206 to implement one or more of the functions described herein.

The processor 1204 may further include communication and processing circuitry 1244 configured to communicate with UEs over a carrier frequency. In some examples, the communication and processing circuitry 1244 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1244 may be configured to generate and transmit one or more RRC messages including one or more resource settings 1215 and one or more report settings 1216 to one or more UEs via the transceiver 1210. The communication and processing circuitry 1244 may further be configured to generate and transmit an activation or deactivation message (e.g., via a MAC-CE) to a UE via the transceiver 1210 to activate or deactivate a semi-persistent report setting associated with PUCCH reporting. In addition, the communication and processing circuitry 1244 may be configured to generate and transmit a trigger message (e.g., via DCI) to a UE via the transceiver 1210 to trigger an aperiodic or semi-persistent report setting associated with PUSCH reporting. Furthermore, the communication and processing circuitry 1244 may be configured to generate and transmit report information associated with an aperiodic report setting (e.g., via the DCI containing the trigger message or a different message) to a UE via the transceiver 1210 to indicate a list and/or order of beam measurements to include in an aperiodic L1 measurement report.

The communication and processing circuitry 1244 may further be configured to generate and transmit a plurality of reference signals (SSBs and/or -RSs) on a plurality of beams using the antenna array 1220 and transceiver 1210. The communication and processing circuitry 1244 may further be configured to receive one or more uplink L1 measurement reports 1218 on one or more PUCCH or PUSCH from one or more UEs. The communication and processing circuitry 1244 may further be configured to execute communication and processing software 1254 stored in the computer-readable medium 1206 to implement one or more of the functions described herein.

The processor 1204 may further include report configuration circuitry 1246, configured to select at least one resource setting 1215 and at least one report setting 1216 for a UE. In some examples, the report configuration circuitry 1246 may further be configured to select a compact measurement report setting 1217. In some examples, the report configuration circuitry 1246 may further be configured to enable compact measurement report settings 1217 to allow the UE to use L1 compact measurement reports. In some examples, the report configuration circuitry 1246 may further be configured to enable compact measurement reports to be used per report setting (e.g., multiple information types may be sent in a single L1 measurement report) or per L1 measurement report (e.g., all report settings have the same information type in a single L1 measurement report).

In some examples, the report configuration circuitry 1246 may further be configured to select the report information for an aperiodic report setting or aperiodic L1 measurement report. For example, the report configuration circuitry 1246 may be configured to select a list and/or order of beam IDs to include in an L1 measurement report or within all L1 measurement reports associated with a particular report setting. In some examples, the list and/or order may be selected to be the same order as a last report setting utilized by the UE to generate an L1 measurement report or a last L1 measurement report of the same or a different report setting. The report configuration circuitry 1246 may further be configured to execute report configuration software 1256 stored in the computer-readable medium 1206 to implement one or more of the functions described herein.

The processor 1204 may further include L1 measurement report processing circuitry 1248, configured to receive and process an L1 measurement report 1218 received from a UE. The L1 measurement report 1218 can include beam measurement information including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) may be measured by the UE. The L1 measurement report 1218 may include up to four beam IDs and corresponding beam measurements as configured in the associated report setting 1216.

Figure 13:
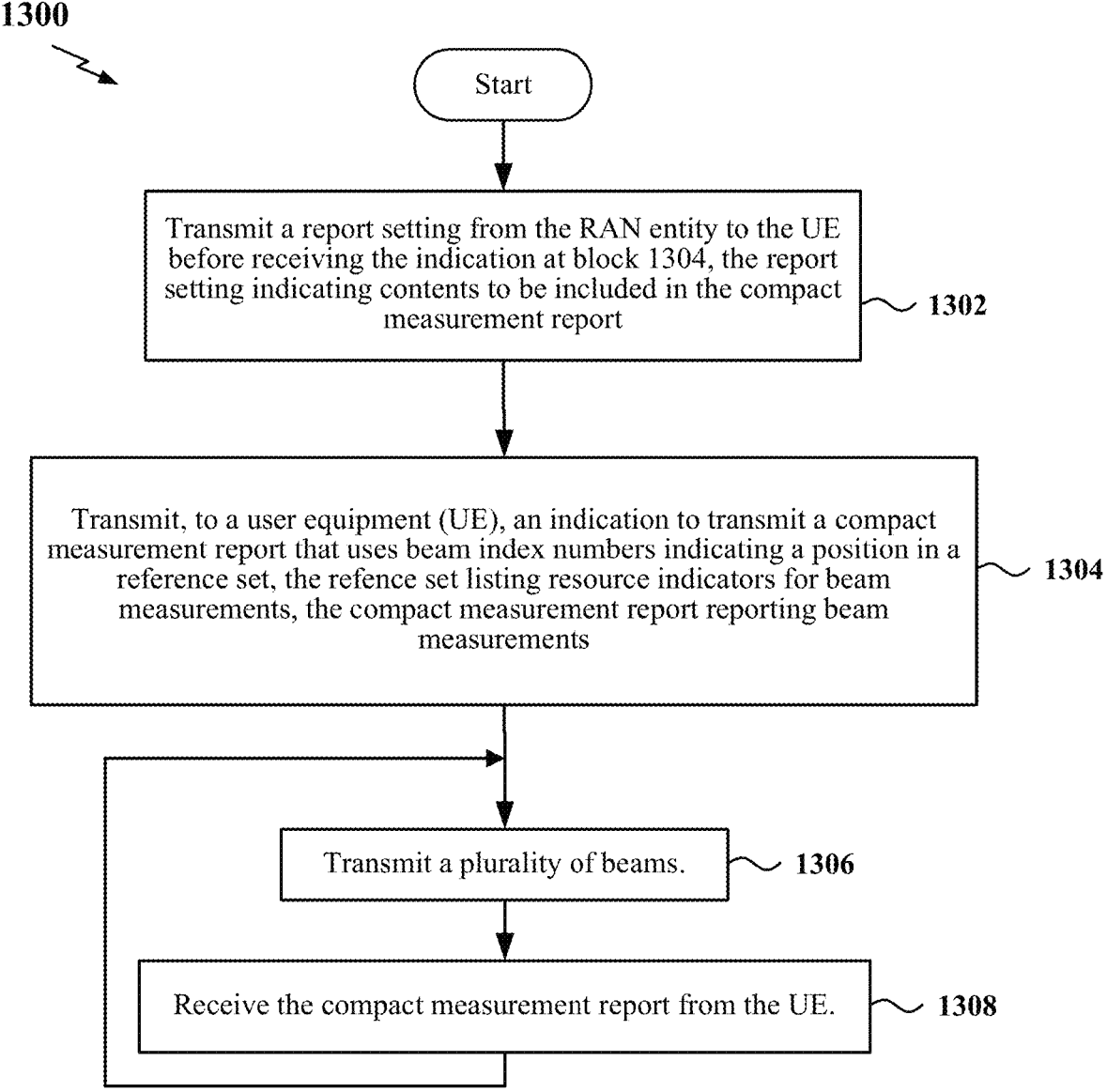
FIG. 13 is a flow chart of an exemplary method for a RAN node receiving transient compact measurement reports according to some aspects.

FIG. 13 is a flow chart of an exemplary method for a RAN node receiving transient compact measurement reports according to some aspects. As described below, some or all illustrated features may be omitted in a particular implementation within the scope of the present disclosure, and some illustrated features may not be required for implementation of all embodiments. In some examples, the method may be performed by the RAN node 1200, as described above and illustrated in FIG. 12, by a processor or processing system, or by any suitable means for carrying out the described functions.

At block 1302, the RAN node may transmit a report setting to the UE before receiving the indication at block 1304. The report setting can indicate the contents to be included in the compact measurement report such as which reference set to use, the quantization level, the number of bits to use for the reported beam measurements, and whether the reported beam measurements are absolute or differential. The contents can be SINR or RSRP beam measurements. The report configuration circuitry 1246, together with the communication and processing circuitry 1244 and transceiver 1210, shown and described above in connection with FIG. 12, may transmit the at least one report setting.

At block 1304, the RAN node may transmit, to a user equipment (UE), an indication to transmit a compact measurement report that uses beam index numbers indicating a position in a reference set. The reference set can list resource indicators, such as CRIs, for beam measurements. The compact measurement report reports beam measurements in association with the beam index numbers. Using a mapping such as mapping 1104, CRIs can be associated with each one of the reported beam measurements. The measurement report can be the compact measurement report configured via the report setting transmitted at block 1302 or can be any other previously set compact measurement report such as a measurement report specified by a standard that may be installed or stored during manufacture, software installation, or at some other time.

At block 1306, the RAN node transmits a plurality of beams. The RAN node can transmit reference signals, such as a SSB or CSI-RS, on each of a plurality of beams in a beam-sweeping manner. In some examples, the RAN node may transmit a reference signal on each of the plurality of beams. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams.

At block 1308, the RAN node receives a compact measurement report from the UE. An L1 measurement report can include beam measurement information including beam measurements, each corresponding to one of a plurality of beams utilized for communication with the UE. Each respective beam may be associated with a respective beam identifier via a beam index number and a reference set. The respective beam identifiers may include a respective reference signal resource indicator associated with the reference signal and the respective beam. In some examples, the reference signal may include a SSB or CSI-RS. In some examples, the first beam measurement information includes a respective reference signal received power (RSRP) measurement for each of the plurality of beams or a respective signal-to-interference-plus-noise (SINR) measurement for each of the plurality of beams. The RAN node receives the compact measurement report which uses the configuration indicated at block 1304. The method can then loop back to the RAN transmitting a plurality of beams 1306. As such, the RAN can receive compact measurement reports periodically sent by the UE.

Figure 14:
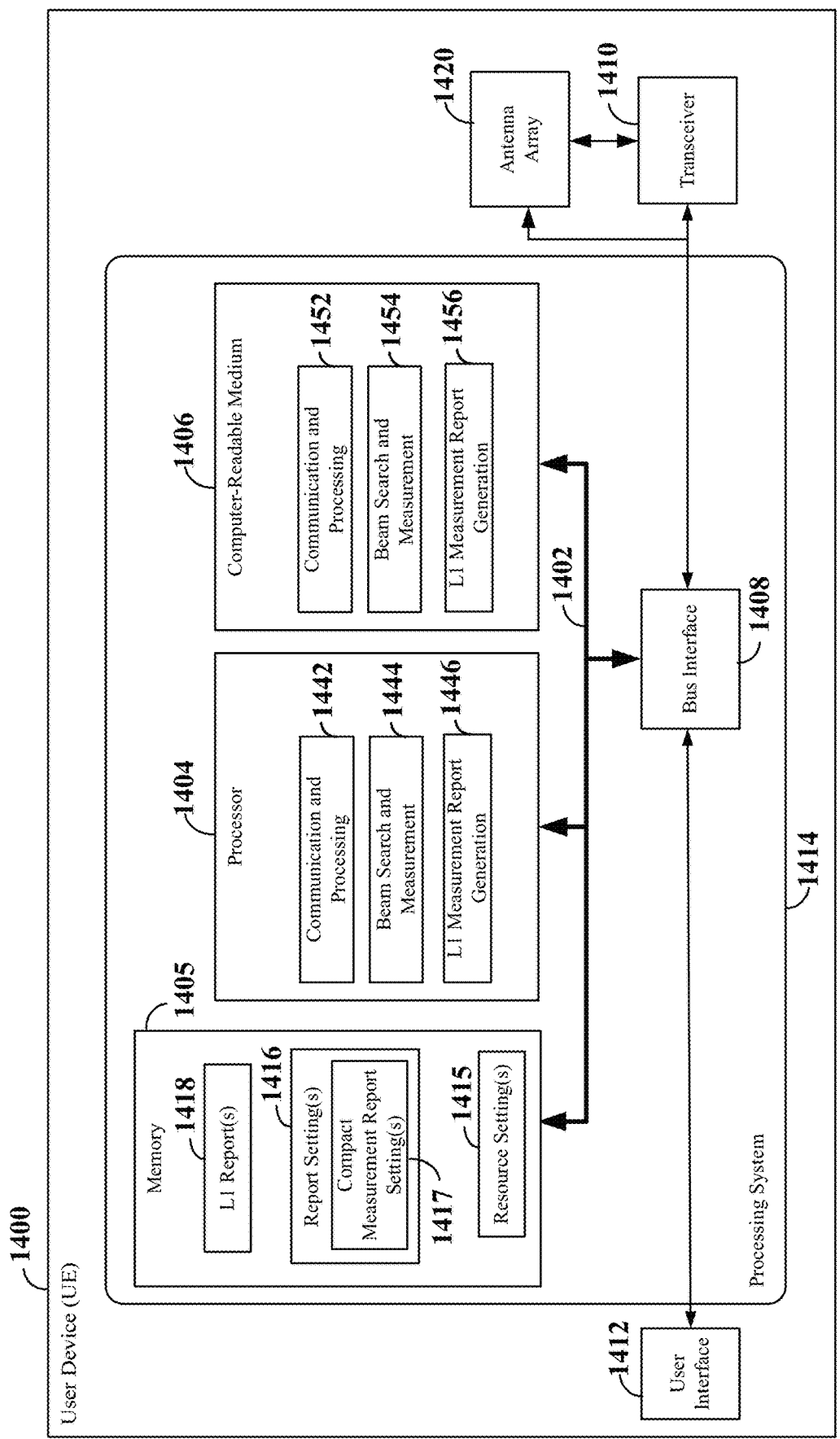
FIG. 14 is a block diagram illustrating an example of a hardware implementation for a UE employing a processing system according to some aspects.

FIG. 14 is a block diagram illustrating an example of a hardware implementation for a UE 1400 employing a processing system 1414 according to some aspects. For example, the UE 1400 may correspond to any of the UEs or scheduled entities shown and described above in reference to FIGS. 1, 2, 4, 5, and/or 7.

In accordance with various aspects of the disclosure, an element, or any portion of an element, or any combination of elements may be implemented with a processing system 1414 that includes one or more processors 1404. The processing system 1414 may be substantially the same as the processing system 1214 illustrated in FIG. 12, including a bus interface 1408, a bus 1402, memory 1405, a processor 1404, and a computer-readable medium 1406. Furthermore, the UE 1400 may include a user interface 1412, a transceiver 1410 that can be a wireless transceiver, and an antenna array 1420 substantially similar to those described above in FIG. 12. That is, the processor 1404, as utilized in a UE 1400, may be used to implement any one or more of the processes described below.

In some aspects of the disclosure, the processor 1404 may include circuitry configured for various functions. For example, the processor 1404 may include communication and processing circuitry 1442 configured to communicate with a RAN node (e.g., a base station, such as a gNB) via the transceiver 1410. The communication and processing circuitry 1442 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1442 may be configured to exchange control information and data with the RAN node via one or more subframes, slots, and/or mini-slots.

In some examples, the communication and processing circuitry 1442 may be configured to receive one or more RRC messages including one or more resource settings 1415 (e.g., CSI resource settings) and one or more report settings 1416 (e.g., CSI report settings) from the serving RAN node via the transceiver 1410. The resource setting(s) 1415 and report setting(s) 1416 may be maintained, for example, in memory 1405 for subsequent use thereof.

The communication and processing circuitry 1442 may further be configured to receive an activation or deactivation message (e.g., via a MAC-CE) from the RAN node via the transceiver 1410 to activate or deactivate a semi-persistent report setting associated with PUCCH reporting. In addition, the communication and processing circuitry 1442 may be configured to receive a trigger message (e.g., via DCI) from the RAN node via the transceiver 1410 to trigger an aperiodic or semi-persistent report setting associated with PUSCH reporting. Furthermore, the communication and processing circuitry 1442 may be configured to receive report information associated with an aperiodic report setting (e.g., via the DCI containing the trigger message or a different message) from the RAN node via the transceiver 1410 that indicates a list and/or order of beam measurements to include in an aperiodic L1 measurement report.

The communication and processing circuitry 1442 may further be configured to receive a plurality of reference signals (SSBs and/or -RSs) on a plurality of beams using the antenna array 1420 and transceiver 1410. The communication and processing circuitry 1442 may further be configured to transmit an uplink L1 measurement report including beam measurement information (BMI) 1418 on a PUCCH or PUSCH to the RAN node. The communication and processing circuitry 1442 may further be configured to execute communication and processing software 1452 stored in the computer-readable medium 1406 to implement one or more of the functions described herein.

The processor 1404 may further include beam search and measurement circuitry 1444, configured to control the antenna array 1420 and transceiver 1410 to search for and identify a plurality of beams during a downlink beam sweep. The beam search and measurement circuitry 1444 may further be configured to receive a respective reference signal (e.g., SSB or CSI-RS) and measure a respective RSRP, SINR, or other suitable beam measurement of the respective reference signal on each of a set of the plurality of beams identified in a report setting 1416 and associated resource setting 1415. For example, the report setting 1416 may be associated with a resource setting 1415 including a configuration of one or more resource sets, each including a plurality of beam IDs indicating the set of beams and associated reference signal resources on which to obtain the beam measurements. The obtained beam measurements may be stored as the BMI 1418 within, for example, memory 1405 for use in generating an L1 measurement report including the BMI 1418. The beam search and measurement circuitry 1444 may further be configured to execute beam search and measurement software 1454 stored in the computer-readable medium 1406 to implement one or more of the functions described herein.

The processor 1404 may further include L1 measurement report generation circuitry 1446, configured to generate an L1 measurement report (e.g., a current L1 measurement report) based on the report setting 1416 and corresponding resource setting 1415 used to obtain the BMI 1418. The L1 measurement report generation circuitry 1446 may further operate together with the communication and processing circuitry 1442 and transceiver 1410 to transmit the current L1 measurement report to the RAN node. The current L1 measurement report can include the BMI 1418 including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) was measured. The current L1 measurement report may include up to four beam IDs and corresponding beam measurements as configured in the report setting 1416.

The processor 1404 may further include report configuration circuitry 1446, configured to select at least one resource setting 1415 and at least one report setting 1416 for the UE. In some examples, the report configuration circuitry 1446 may further be configured to select a compact measurement report setting 1417 as one or more of the report settings 1416. In some examples, the report configuration circuitry 1446 may further be configured to enable compact measurement reports to allow the UE to use L1 compact measurement reports associated with the report settings 1416. In some examples, the report configuration circuitry 1446 may further be configured to enable compact measurement reports to be used per report setting (e.g., multiple information types may be sent in a single L1 measurement report) or per L1 measurement report (e.g., all report settings have the same information type in a single L1 measurement report).

Figure 15:
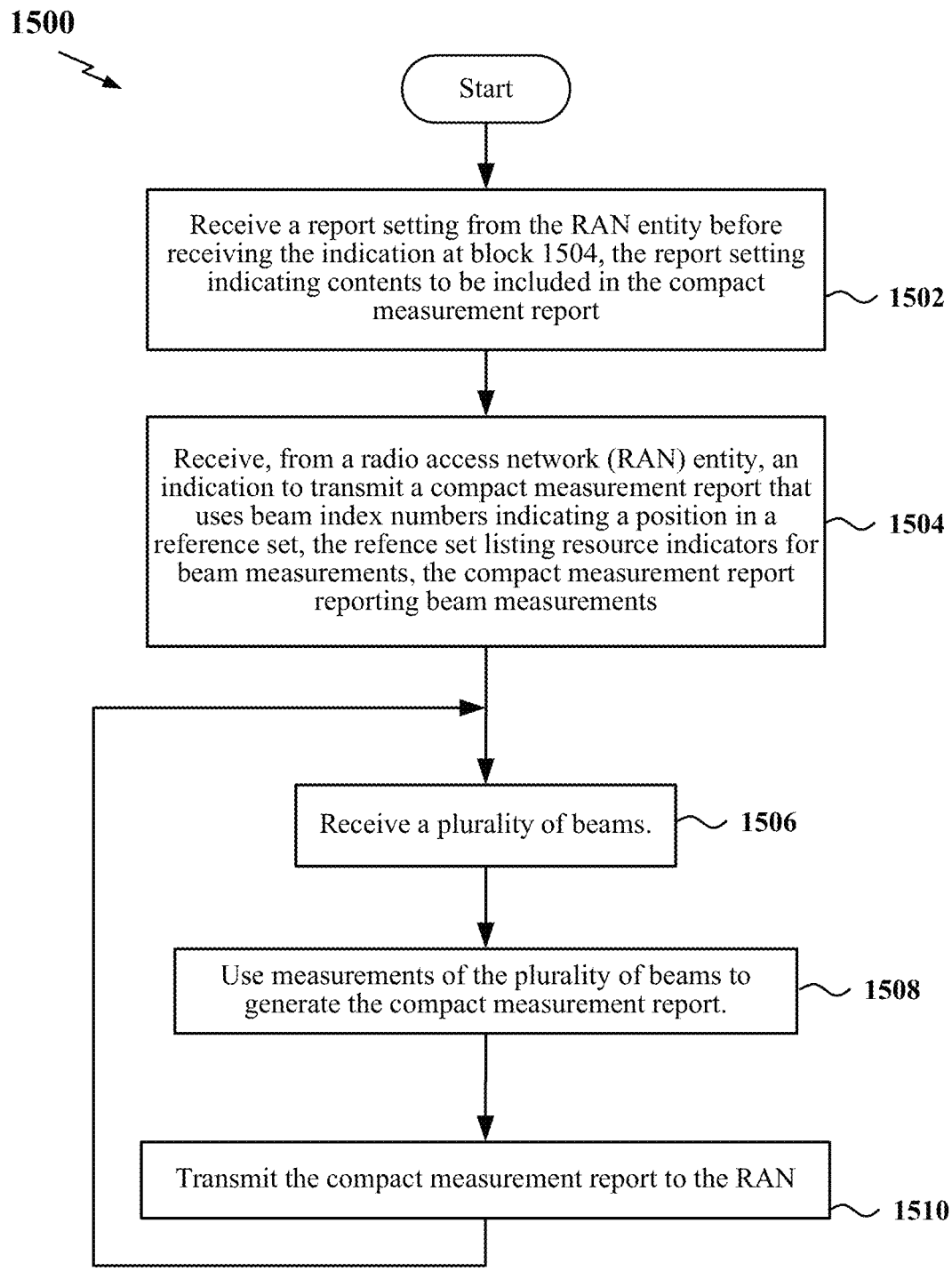
FIG. 15 is a flow chart of an exemplary method for a UE transmitting transient compact measurement reports according to some aspects.

FIG. 15 is a flow chart of an exemplary method for a UE transmitting transient compact measurement reports according to some aspects. As described below, some or all illustrated features may be omitted in a particular implementation within the scope of the present disclosure, and some illustrated features may not be required for implementation of all embodiments. In some examples, the method may be performed by the UE 1400, as described above and illustrated in FIG. 14, by a processor or processing system, or by any suitable means for carrying out the described functions.

At block 1502, the UE can receive a report setting from the RAN entity before receiving the indication at block 1504. The report setting can indicate the contents to be included in the compact measurement report such as which reference set to use, the quantization level, the number of bits to use for the reported beam measurements, and whether the reported beam measurements are absolute or differential. The contents can be SINR or RSRP beam measurements. The report configuration circuitry 1446, together with the communication and processing circuitry 1442 and transceiver 1410, shown and described above in connection with FIG. 14, may receive the at least one report setting.

At block 1504, the UE may receive, from a radio access network (RAN) entity, an indication to transmit a compact measurement report that uses beam index numbers indicating a position in a reference set. The reference set can list resource indicators, such as CRIs, for beam measurements. The compact measurement report reports beam measurements in association with the beam index numbers. Using a mapping such as mapping 1104, CRIs can be associated with each one of the reported beam measurements. The measurement report can be the compact measurement report configured via the report setting transmitted at block 1502 or can be any other previously set compact measurement report such as a measurement report specified by a standard that may be installed or stored during manufacture, software installation, or at some other time.

At block 1506, the UE receives a plurality of beams transmitted by the RAN node. The RAN node can transmit reference signals, such as a SSB or CSI-RS, on each of a plurality of beams in a beam-sweeping manner. In some examples, the RAN node may transmit a reference signal on each of the plurality of beams. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams.

At block 1508, the UE uses measurements of the plurality of beams to generate the compact measurement report. As discussed above, the processor 1404 may further include beam search and measurement circuitry 1444, configured to control the antenna array 1420 and transceiver 1410 to search for and identify a plurality of beams during a downlink beam sweep. The beam search and measurement circuitry 1444 may further be configured to receive a respective reference signal (e.g., SSB or CSI-RS) and measure a respective RSRP, SINR, or other suitable beam measurement of the respective reference signal on each of a set of the plurality of beams identified in a report setting 1416 and associated resource setting 1415.

At block 1510, the UE transmits the compact measurement report to the RAN node. An L1 measurement report can include beam measurement information including beam measurements, each corresponding to one of a plurality of beams utilized for communication with the UE. Each respective beam may be associated with a respective beam identifier via a beam index number and a reference set. The respective beam identifiers may include a respective reference signal resource indicator associated with the reference signal and the respective beam. In some examples, the reference signal may include a SSB or CSI-RS. In some examples, the first beam measurement information includes a respective reference signal received power (RSRP) measurement for each of the plurality of beams or a respective signal-to-interference-plus-noise (SINR) measurement for each of the plurality of beams. The RAN node receives the compact measurement report which uses the configuration indicated at block 1504. The method can then loop back to block 1506. As such, the RAN can receive compact measurement reports periodically sent by the UE.

Figure 16:
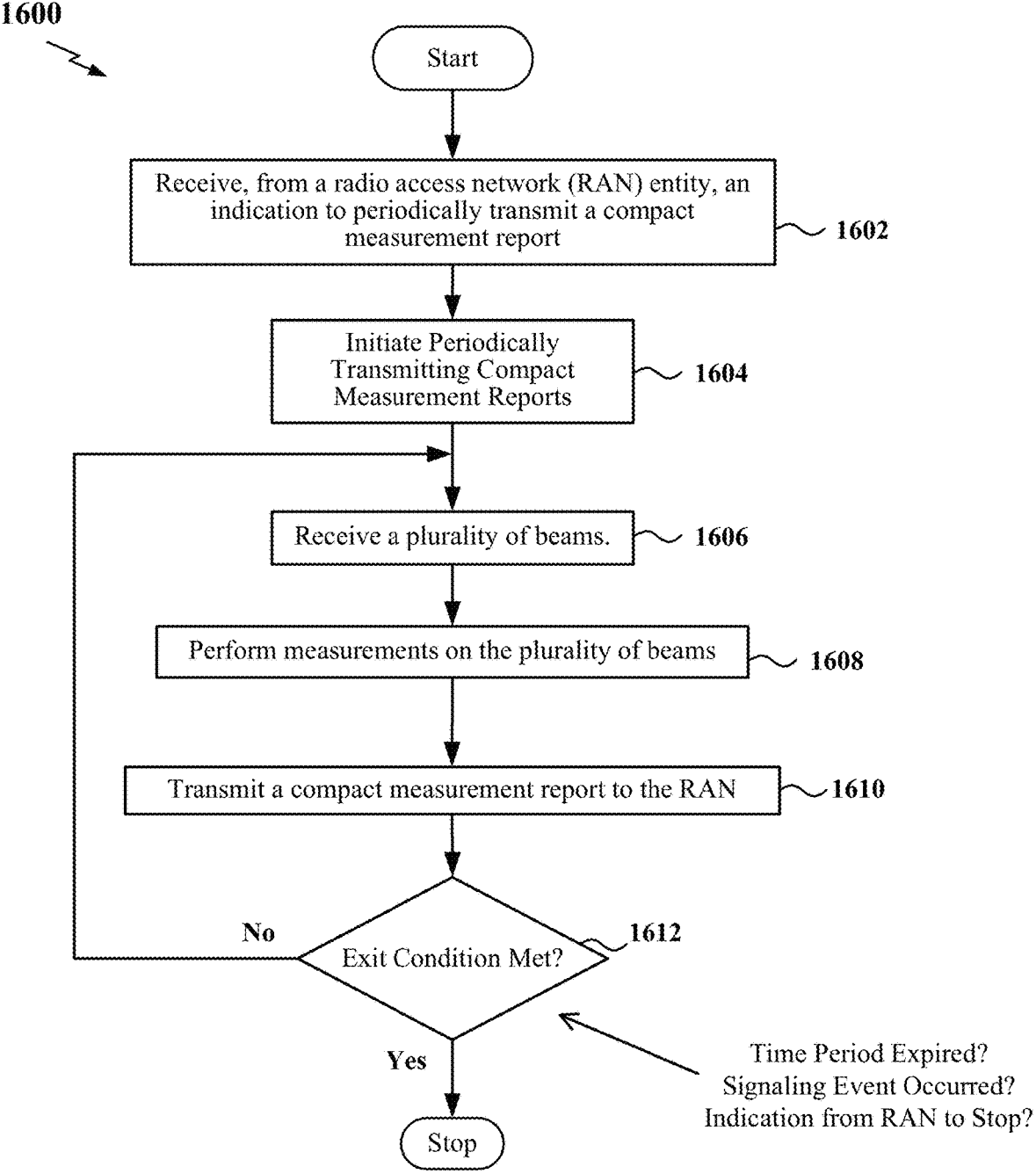
FIG. 16 is a flow chart of an exemplary method for a UE transmitting transient compact measurement reports until a condition is met according to some aspects.

FIG. 16 is a flow chart of an exemplary method for a UE transmitting transient compact measurement reports until a condition is met according to some aspects. At block 1602, the UE receives, from a radio access network (RAN) entity, an indication to periodically transmit a compact measurement report. The report configuration circuitry 1446, together with the communication and processing circuitry 2 and transceiver 1410, shown and described above in connection with FIG. 14, may receive the indication of block 1602. At block 1604, the UE initiates periodically sending compact measurement reports.

At blocks 1606, 1608, and 1610 the UE receives a plurality of beams, performs measurements on the plurality of beams, and transmits a compact measurement report to the RAN. Blocks 1606, 1608, and 1610 are similar to blocks 1506, 1508, and 1510 respectively, which are described in detail above. At block 1612, the method checks if an exit condition is met. If the exit condition is met, the method can stop periodically sending compact measurement reports. If the exit condition is not met, the method can continue periodically transmitting compact measurement reports by looping back to block 1606. Examples of the exit condition can include expiration of a predefined time period (a timer times out), occurrence of a signaling event, or an indication to stop is received from a RAN node.

Figure 17:
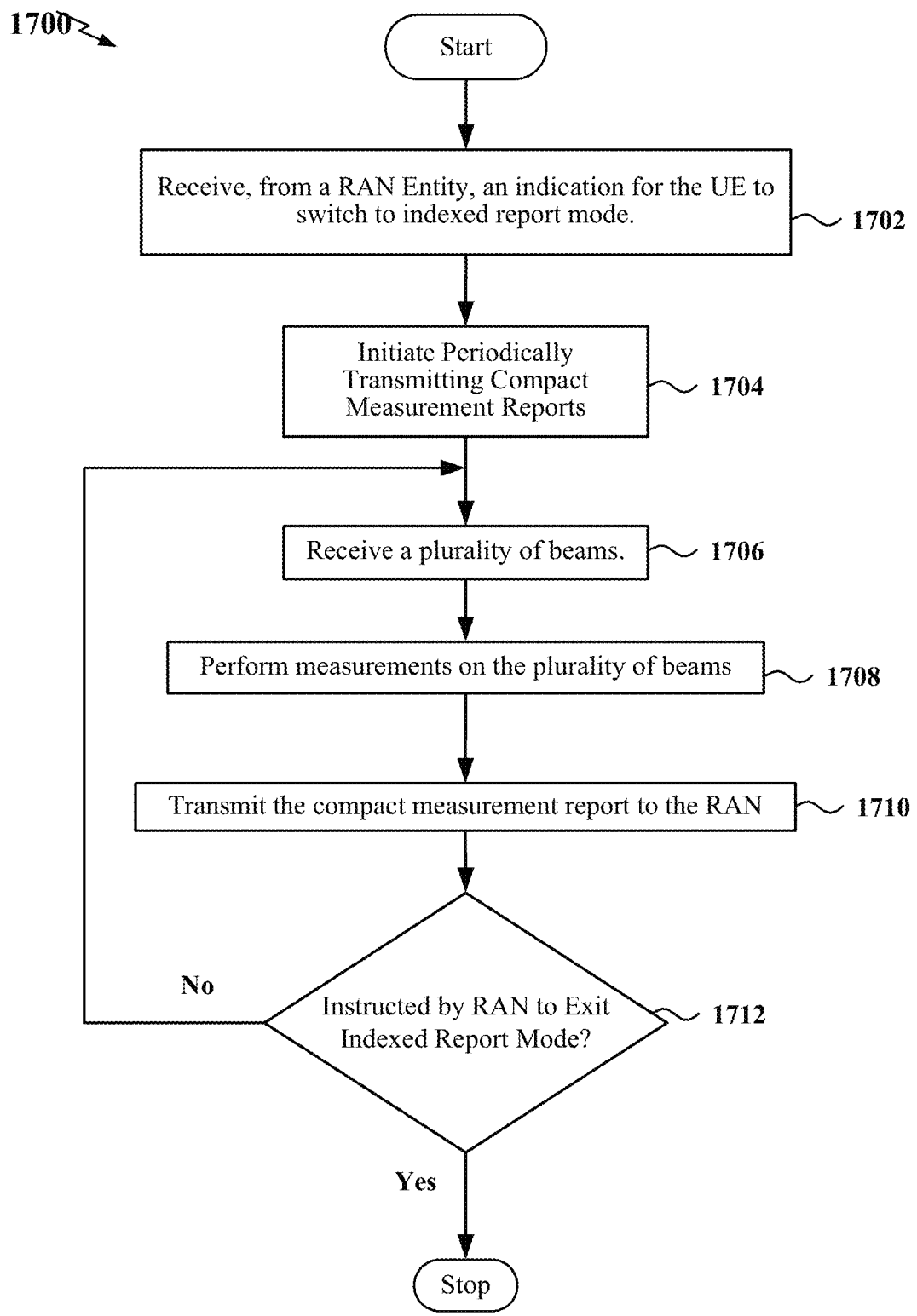
FIG. 17 is a flow chart of an exemplary method for a UE transmitting transient compact measurement reports while in indexed report mode according to some aspects.

FIG. 17 is a flow chart of an exemplary method for a UE transmitting transient compact measurement reports while in indexed report mode according to some aspects. At block 1702, the UE receives, from a radio access network (RAN) entity, an indication for the UE to switch to indexed report mode. The report configuration circuitry 1446, together with the communication and processing circuitry 1442 and transceiver 1410, shown and described above in connection with FIG. 14, may receive the indication of block 1702. The switch to indexed report mode can trigger the UE to begin periodically sending compact measurement reports. At block 1604, the UE initiates periodically sending compact measurement reports.

At blocks 1706, 1708, and 1710 the UE receives a plurality of beams, performs measurements on the plurality of beams, and transmits a compact measurement report to the RAN. Blocks 1706, 1708, and 1710 are similar to blocks 1506, 1508, and 1510 respectively, which are described in detail above. At block 1712, the method checks if the UE has been instructed by the RAN to exit indexed report mode. If the UE has been instructed by the RAN to exit indexed report mode, the UE can exit indexed report mode, thereby stopping the periodic transmission of compact measurement reports. If the UE has not been instructed by the RAN to exit indexed report mode, the method can continue periodically transmitting compact measurement reports by looping back to block 1706. The UE can also exit indexed report mode if an exit condition is met, as discussed above in reference to block 1612 of FIG. 16.

The following provides an overview of aspects of the present disclosure:

Aspect 1: A method for wireless communication at a user device (UE), the method comprising: receiving, from a radio access network (RAN) entity, an indication to transmit a compact measurement report that uses beam index numbers indicating a position in a reference set, the reference set listing resource indicators for beam measurements, the compact measurement report reporting beam measurements; receiving a plurality of beams; using measurements of the plurality of beams to generate the compact measurement report; and transmitting the compact measurement report to the RAN entity.

Aspect 2: The method of aspect 1, wherein each of the beam index numbers are represented using a first number of bits, each of the resource indicators represented in a measurement report using a second number of bits, and the first number of bits is less than the second number of bits.

Aspect 3: The method of aspect 1 or 2 wherein the resource indicators are 4 bits long in a measurement report that uses resource indicators and the beam index numbers are 2 bits long in the compact measurement report.

Aspect 4: The method of any of aspects 1 through 3, further comprising: receiving a report setting from the RAN entity before receiving the indication, the report setting indicating contents to be included in the compact measurement report.

Aspect 5: The method of any of aspects 1 through 4, wherein a compact measurement report specification is stored in the UE, the compact measurement report specification indicating contents to be included in the compact measurement report.

Aspect 6: The method of any of aspects 1 through 5, wherein the reference set is a most recent measurement report previously transmitted by the UE.

Aspect 7: The method of any of aspects 1 through 5, wherein the reference set is a measurement report transmitted by the UE at a specified time.

Aspect 8: The method of any of aspects 1 through 5, wherein the reference set is a preconfigured reference set stored in the UE.

Aspect 9: The method of any of aspects 1 through 5, wherein the reference set is a measurement report previously transmitted by the UE to report a first number of beam measurements, the compact measurement report reporting a second set number of beam measurements, and the second number less than the first number.

Aspect 10: The method of any of aspects 1 through 9, wherein the indication instructs the UE to switch to an indexed report mode, the UE configured to send the compact measurement report while in the indexed report mode.

Aspect 11: The method of any of aspects 1 through 10, wherein contents of the compact measurement report are specified relative to the contents of a measurement report.

Aspect 12: The method of any of aspects 1 through 11, wherein a number of beam measurements in the compact measurement report is specified as a set fraction of the number of beam measurements in a measurement report.

Aspect 13: The method of any of aspects 1 through 11, wherein a number of beam measurements in the compact measurement report is specified as the number of beam measurements in a measurement report minus a set number.

Aspect 14: The method of any of aspects 1 through 13, wherein the compact measurement report has a quantization level that is specified relative to the quantization level of a measurement report.

Aspect 15: The method of any of aspects 1 through 14, wherein the compact measurement report is a physical layer compact measurement report.

Aspect 16: The method of any of aspects 1 through 15, further comprising: receiving, from the RAN entity, a second indication to stop sending the compact measurement report.

Aspect 17: The method of any of aspects 1 through 16, wherein the beam measurements include a reference signal received power (RSRP) measurement.

Aspect 18: The method of any of aspects 1 through 16, wherein the beam measurements include a signal to interference plus noise ratio (SINR) measurement.

Aspect 19: A user equipment (UE) comprising: a wireless transceiver; a memory; and a processor communicatively coupled to the wireless transceiver and the memory, wherein the wireless transceiver, memory, and processor are configured to perform a method of any one of the aspects 1 through 18.

Aspect 20: A user equipment (UE) comprising: a wireless transceiver; a memory; and a processor communicatively coupled to the wireless transceiver and the memory, wherein the wireless transceiver, memory, and processor are configured to: receive, from a radio access network (RAN) entity, an indication to transmit a compact measurement report that uses beam index numbers indicating a position in a reference set, the reference set listing resource indicators for beam measurements, the compact measurement report reporting beam measurements; receive a plurality of beams; use measurements of the plurality of beams to generate the compact measurement report; and transmit the compact measurement report to the RAN entity.

Aspect 21: A method of for wireless communication at a radio access network (RAN) node, the method comprising: transmitting, to a user equipment (UE), an indication to transmit a compact measurement report that uses beam index numbers indicating a position in a reference set, the reference set listing resource indicators for beam measurements, the compact measurement report reporting beam measurements; transmitting a plurality of beams; and receiving the compact measurement report from the UE.

Aspect 22: The method of aspect 21, wherein each of the beam index numbers are represented using a first number of bits, each of the resource indicators represented in a measurement report using a second number of bits, and the first number of bits is less than the second number of bits.

Aspect 23: The method of aspect 21 or 22, further comprising: transmitting a report setting from the RAN node to the UE before receiving the indication, the report setting indicating contents to be included in the compact measurement report.

Aspect 24: The method of any of aspects 21 through 23, wherein the reference set is a most recent measurement report previously transmitted by the UE.

Aspect 25: The method of any of aspects 21 through 23, wherein the reference set is a measurement report transmitted by the UE at a specified time.

Aspect 26: The method of any of aspects 21 through 23, wherein the reference set is a preconfigured reference set stored in the UE.

Aspect 27: The method of any of aspects 21 through 23, wherein the reference set is a measurement report previously transmitted by the UE to report a first number of beam measurements, the compact measurement report reporting a second set number of beam measurements, and the second number less than the first number.

Aspect 28: The method of any of aspects 21 through 27, the indication instructs the UE to switch to an indexed report mode, and the UE is configured to send the compact measurement report while in the indexed report mode.

Aspect 29: The method of any of aspects 21 through 28, wherein the compact measurement report has a quantization level that is specified relative to the quantization level of a measurement report.

Aspect 30: The method of any of aspects 21 through 30, further comprising: sending, to the UE, a second indication to stop sending the compact measurement report.

Aspect 31: A radio access network (RAN) node comprising: a wireless transceiver; a memory; and a processor communicatively coupled to the wireless transceiver and the memory, wherein the wireless transceiver, memory, and processor are configured to: perform a method of any one of the aspects 21 through 30.

Aspect 32: A radio access network (RAN) node comprising: a wireless transceiver; a memory; and a processor communicatively coupled to the wireless transceiver and the memory, wherein the wireless transceiver, memory, and processor are configured to: transmit to a user equipment (UE), an indication to transmit a compact measurement report that uses beam index numbers indicating a position in a reference set, the reference set listing resource indicators for beam measurements, the compact measurement report reporting beam measurements; transmit a plurality of beams; and receive the compact measurement report from the UE.

Aspect 33: An apparatus configured for wireless communication comprising at least one means for performing a method of any one of aspects 1 through 18, 20 through 30, or 32.

Aspect 34: A non-transitory computer-readable medium storing computer-executable code, comprising code for causing an apparatus to perform a method of any one of aspects 1 through 18, 20 through 30, or 32.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from features disclosed herein. The apparatus, devices, and/or components illustrated in the figures may be configured to perform one or more of the methods, features, or steps described herein. The algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user device (UE), the method comprising:
    sending, from the UE to a radio access network (RAN) entity, a measurement report reporting a first number of CSI-RS resource indicators in association with beam measurements;
    receiving, from the RAN entity, an indication to transmit a compact measurement report that uses beam index numbers indicating a position in the measurement report;
    receiving a plurality of beams;
    using measurements of the plurality of beams to generate the compact measurement report, the compact measurement report including a second number of the beam index numbers in association with beam measurements; and
    transmitting the compact measurement report to the RAN entity.

2. The method of claim 1, wherein the beam index numbers are represented using fewer bits than are used to represent the CSI-RS resource indicators in the measurement report.

3. The method of claim 1 wherein the CSI-RS resource indicators are 4 bits long and the beam index numbers are 2 bits long in the compact measurement report.

4. The method of claim 1, further comprising:
    receiving a report setting from the RAN entity before receiving the indication, the report setting indicating contents to be included in the compact measurement report.

5. The method of claim 1, wherein a compact measurement report specification is stored in the UE, the compact measurement report specification indicating contents to be included in the compact measurement report.

6. The method of claim 1, wherein the measurement report is a most recent measurement report previously transmitted by the UE.

7. The method of claim 1, wherein the measurement report is specified as the measurement report transmitted by the UE at a specified time.

8. The method of claim 1, wherein the UE the first number is less than a number of CSI-RS resource indicators that are stored by the UE and that are associated with CSI-RS resources.

9. The method of claim 1, wherein the measurement report was previously transmitted by the UE, and the second number less than the first number.

10. The method of claim 1, wherein the indication instructs the UE to switch to an indexed report mode, the UE configured to send the compact measurement report while in the indexed report mode.

11. The method of claim 1, wherein contents of the compact measurement report are specified relative to the contents of the measurement report.

12. The method of claim 1, wherein the second number is is a set fraction of the first number, and the RAN entity specifies the set fraction.

13. The method of claim 1, wherein the second number is specified as the the first number-minus a set number.

14. The method of claim 1, wherein the compact measurement report has a quantization level that is specified relative to the quantization level of the measurement report.

15. The method of claim 1, wherein the compact measurement report is a physical layer compact measurement report.

16. The method of claim 1, further comprising:
    receiving, from the RAN entity, a second indication to stop sending the compact measurement report.

17. The method of claim 1, wherein the beam measurements include a reference signal received power (RSRP) measurement.

18. The method of claim 1, wherein the beam measurements include a signal to interference plus noise ratio (SINR) measurement.

19. A user equipment (UE) comprising:
    a wireless transceiver;
    a memory; and
    a processor communicatively coupled to the wireless transceiver and the memory, wherein the wireless transceiver, memory, and processor are configured to:
    produce a measurement report that includes a plurality of CSI-RS resource indicators in association with a first number of beam measurements;
    receive, from a radio access network (RAN) entity, an indication to transmit a compact measurement report that uses beam index numbers indicating a position the measurement report;
    receive a plurality of beams;
    use measurements of the plurality of beams to generate the compact measurement report, the compact measurement report including the beam index numbers in association with a second number of beam measurements; and
    transmit the compact measurement report to the RAN entity.

20. A method of for wireless communication at a radio access network (RAN) node, the method comprising:

receiving, from a user equipment (UE), a measurement report that includes a first number of CSI-RS resource indicators in association with beam measurements;

transmitting, to the UE, an indication to transmit a compact measurement report that uses beam index numbers indicating a position in the measurement report;

transmitting a plurality of beams; and receiving the compact measurement report from the UE, the compact measurement report including a second number of the beam index numbers in association with beam measurements.

21. The method of claim 20, wherein the beam index numbers are represented using fewer bits than are used to represent the CSI-RS resource indicators in the measurement report.

22. The method of claim 20, further comprising:
transmitting a report setting from the RAN node to the UE before receiving the indication, the report setting indicating contents to be included in the compact measurement report.

23. The method of claim 20, wherein the measurement report is a most recent measurement report previously transmitted by the UE.

24. The method of claim 20, wherein the measurement report is specified as the measurement report transmitted by the UE at a specified time.

25. The method of claim 20, wherein the first number is less than a number of CSI-RS resource indicators that are stored by the UE and that are associated with CSI-RS resources.

26. The method of claim 20, wherein the the second number is less than the first number.

27. The method of claim 20, wherein the indication instructs the UE to switch to an indexed report mode, and the UE is configured to send the compact measurement report while in the indexed report mode.

28. The method of claim 20, wherein the compact measurement report has a quantization level that is specified relative to the quantization level of the measurement report.

29. The method of claim 20, further comprising:
sending, to the UE, a second indication to stop sending the compact measurement report.

30. A radio access network (RAN) node comprising:
a wireless transceiver;
a memory; and
a processor communicatively coupled to the wireless transceiver and the memory, wherein the wireless transceiver, memory, and processor are configured to:

receiving, from a user equipment (UE), a measurement report that includes a plurality of CSI-RS resource indicators in association with a first number of beam measurement;

transmit to the UE, an indication to transmit a compact measurement report that uses beam index numbers indicating a position in the measurement report;

transmit a plurality of beams; and receive the compact measurement report from the UE, the compact measurement report including the beam index numbers in association with a second number of beam measurements.

* * * * *